(12) United States Patent
Reinshagen et al.

(10) Patent No.: US 11,050,106 B2
(45) Date of Patent: Jun. 29, 2021

(54) ENERGY STORAGE UNIT, PARTICULARLY A BATTERY MODULE, AND AN ENERGY STORAGE SYSTEM COMPRISING A PLURALITY OF ENERGY STORAGE UNIT

(71) Applicant: Robert Bosch GmbH, Stuttgart (DE)

(72) Inventors: Holger Reinshagen, Bamberg (DE);
Markus Kohlberger, Stuttgart (DE);
Martin Gerlach, Strullendorf (DE);
Silvan Poller, Neisseaue Ot Kaltwasser (DE); Michael Austen, Bamberg (DE);
Rudi Kaiser, Bamberg (DE);
Sarmimala Hore, Stuttgart (DE);
Sebastian Bannert, Bursa (TR);
Andreas Grasser, Reckendorf (DE);
Gerhard Schubert, Strullendorf (DE)

(73) Assignee: Robert Bosch GmbH, Stuttgart (DE)

( * ) Notice: Subject to any disclaimer, the term of this patent is extended or adjusted under 35 U.S.C. 154(b) by 665 days.

(21) Appl. No.: 15/302,444

(22) PCT Filed: Feb. 24, 2015

(86) PCT No.: PCT/EP2015/053795
§ 371 (c)(1),
(2) Date: Oct. 6, 2016

(87) PCT Pub. No.: WO2015/154910
PCT Pub. Date: Oct. 15, 2015

(65) Prior Publication Data
US 2017/0025657 A1 Jan. 26, 2017

(30) Foreign Application Priority Data
Apr. 7, 2014 (DE) ...................... 10 2014 206 646.8

(51) Int. Cl.
*H01M 50/20* (2021.01)
*H01M 10/0525* (2010.01)
(Continued)

(52) U.S. Cl.
CPC ............. *H01M 50/20* (2021.01); *B60L 50/66* (2019.02); *B60L 58/26* (2019.02);
(Continued)

(58) Field of Classification Search
CPC ...... B60L 50/66; B60L 58/26; B60L 11/1874; B60L 11/1877; H01M 50/213;
(Continued)

(56) References Cited

U.S. PATENT DOCUMENTS 6,864,013 B2    3/2005  Gow et al.
7,678,493 B2 *  3/2010  Morita .................. H01M 2/202
                                                                  429/100
(Continued)

FOREIGN PATENT DOCUMENTS

CN      103038916 A     4/2013
DE      102010032936    5/2012
(Continued)

OTHER PUBLICATIONS

KR 20-0476683 Google Translation Mar. 2015 (downloaded/printed Oct. 14, 2018).*
(Continued)

*Primary Examiner* — Cynthia H Kelly
*Assistant Examiner* — Aaron J Greso
(74) *Attorney, Agent, or Firm* — Michael Best & Friedrich LLP

(57) ABSTRACT

The invention relates to an energy storage unit (1) comprising a plurality of energy storage sub-units (5) that have a first electrode (6) and a second electrode (7), the first electrode (6) and second electrode (7) of a particular energy storage (Continued)

sub-unit (5) being arranged on opposite sides of said energy storage sub-unit (5), and said energy storage unit comprising a receiving device (2) that has a plurality of adjacently-arranged receiving units each spatially delimited by a lateral wall, one energy storage sub-unit (5) being introduced into each receiving unit of said receiving device (2), and the energy storage sub-units (5) being secured in said receiving units such that the electrodes (6, 7) are arranged in a first contact level and in a second contact level, the electrodes (6, 7) arranged in the first contact level being electrically interconnected by means of a first printed circuit board (10) and the electrodes (6, 7) arranged in the second contact level (9) being electrically interconnected by means of a second printed circuit board (11). The invention also relates to an energy storage system which comprises a plurality of electrically-interconnected energy storage units (1) according to the invention.

19 Claims, 12 Drawing Sheets

(51) Int. Cl.
| | | |
|---|---|---|
| *H01M 10/6557* | (2014.01) | |
| *H01M 10/613* | (2014.01) | |
| *H01M 10/643* | (2014.01) | |
| *H01M 10/6556* | (2014.01) | |
| *B60L 58/26* | (2019.01) | |
| *H01M 50/213* | (2021.01) | |
| *H01M 50/502* | (2021.01) | |
| *H01M 10/6567* | (2014.01) | |
| *B60L 50/60* | (2019.01) | |
| *H01M 10/625* | (2014.01) | |
| *H01M 10/42* | (2006.01) | |
| H01M 10/647 | (2014.01) | |

(52) U.S. Cl.
CPC ..... *H01M 10/0525* (2013.01); *H01M 10/425* (2013.01); *H01M 10/613* (2015.04); *H01M 10/625* (2015.04); *H01M 10/643* (2015.04); *H01M 10/6556* (2015.04); *H01M 10/6557* (2015.04); *H01M 10/6567* (2015.04); *H01M 50/213* (2021.01); *H01M 50/502* (2021.01); H01M 10/647 (2015.04); Y02E 60/10 (2013.01); Y02T 10/70 (2013.01)

(58) Field of Classification Search
CPC .. H01M 50/502; H01M 2/1077; H01M 2/105; H01M 2/204; H01M 2/10; H01M 2/206; H01M 10/613; H01M 10/625; H01M 10/643; H01M 10/6556; H01M 10/6557; H01M 10/6567; H01M 10/0525; H01M 10/425

See application file for complete search history.

(56) References Cited

U.S. PATENT DOCUMENTS

| | | | |
|---|---|---|---|
| 2008/0213652 A1* | 9/2008 | Scheucher | B60L 8/00 429/62 |
| 2009/0159354 A1* | 6/2009 | Jiang | B23K 35/00 180/68.5 |
| 2009/0208829 A1 | 8/2009 | Howard et al. | |
| 2009/0297892 A1 | 12/2009 | Ijaz et al. | |
| 2010/0136404 A1* | 6/2010 | Hermann | H01M 10/6555 429/120 |
| 2011/0171505 A1* | 7/2011 | Kishll | H01M 2/34 429/82 |
| 2011/0293986 A1 | 12/2011 | Kozu | |
| 2011/0293998 A1 | 12/2011 | Sato et al. | |
| 2012/0148877 A1* | 6/2012 | Kalman | H01M 2/105 429/7 |

FOREIGN PATENT DOCUMENTS

| | | | | |
|---|---|---|---|---|
| DE | 102011118383 | | 5/2012 | |
| DE | 102012205019 | | 10/2013 | |
| EP | 2202824 | | 6/2010 | |
| KR | 20-0476683 | * | 3/2015 | ............... H05K 1/18 |
| WO | 2013018331 A1 | | 2/2013 | |
| WO | 2013129074 | | 9/2013 | |
| WO | 2014016393 A1 | | 1/2014 | |

OTHER PUBLICATIONS

WELLPCB (Methods of PCB welding, (c) 2007—considered Dec. 2007—pp. 1-13 of 13) {https://www.wellpcb.com/pcb-welding.html}.*
International Search Report for Application No. PCT/EP2015/053795 dated Aug. 17, 2015 (English Translation, 5 pages).

* cited by examiner

ENERGY STORAGE UNIT, PARTICULARLY A BATTERY MODULE, AND AN ENERGY STORAGE SYSTEM COMPRISING A PLURALITY OF ENERGY STORAGE UNIT

BACKGROUND OF THE INVENTION

The invention relates to an energy storage unit, in particular a battery module, comprising a plurality of energy storage subunits having a first electrode and a second electrode, wherein the first electrode and the second electrode of a respective energy storage subunit are arranged on opposite sides of the energy storage subunit, and comprising a receiving device having a plurality of receiving units which are arranged next to one another and are each physically delimited by at least one side wall, wherein in each case one energy storage subunit of the energy storage unit is inserted into a receiving unit of the receiving device, and the energy storage subunits are fixed in the receiving units in such a way that the electrodes of the energy storage subunits are arranged in a first contact-making plane and in a second contact-making plane.

The invention further relates to an energy storage system comprising a plurality of energy storage units which are electrically interconnected.

Energy storage units which comprise a plurality of energy storage subunits are known in the prior art, in particular as battery modules, wherein the energy storage subunits are battery cells, in particular secondary battery cells, that is to say rechargeable battery cells, in this case.

EP 2 202 824 A1 discloses a battery module having a plurality of battery cells, wherein the battery cells have a first electrode and a second electrode. The battery module which is disclosed in said document furthermore comprises a receiving device having receiving units which are arranged next to one another and into which battery cells are inserted. In this case, the electrodes of the battery cells are arranged in a first contact-making plane and in a second contact-making plane. The receiving device in this case has a first housing part having a first connection terminal for making contact with the electrodes in the first contact-making plane and has a second housing part having a second connection terminal for making contact with the electrodes in the second contact-making plane. Furthermore, said document discloses connecting up a plurality of battery modules and thereby providing an energy storage system.

Furthermore, U.S. Pat. No. 6,864,013 B2 discloses an energy storage unit which is designed as a battery block and has a plurality of electrochemical cells which are arranged in a battery housing, wherein a dedicated compartment is provided in the housing for each of the cells. In this case, the housing can have integrated cooling ducts for cooling the battery cells.

DE 10 2012 205 019 A1 discloses a module cover, which comprises a cell contact-making system having a plurality of cell connectors, for the purpose of making contact with battery cells which are arranged in a battery housing.

One disadvantage of the energy storage units which are disclosed in the prior art is, in particular, the low degree of variability in respect of adapting to different requirements which may be placed on the energy storage unit, in particular in respect of the capacitance and power provided.

SUMMARY OF THE INVENTION

Against this background, one object of the invention is to improve an energy storage unit having a plurality of energy storage subunits which are arranged in a receiving device, in particular to the effect that a greater degree of variability in respect of the usability of the energy storage unit is achieved. A particular aim is to achieve a higher degree of variability in respect of use of the energy storage unit in vehicles as energy stores for providing the energy which is required for electric operation of the vehicle. In this case, the aim is to be able to advantageously adapt energy storage units in a simple manner to the respective power requirements for different vehicle models, that is to say the level of complexity in terms of adaptation should be low.

In order to achieve the object, the invention proposes an energy storage unit, in particular a battery module, which comprises a plurality of energy storage subunits having a first electrode and a second electrode, wherein the first electrode and the second electrode of a respective energy storage subunit are arranged on opposite sides of the energy storage subunit. Furthermore, the energy storage unit comprises a receiving device having a plurality of receiving units which are arranged next to one another and are each physically delimited by at least one side wall, in particular a circumferential side wall, wherein in each case one energy storage subunit of the energy storage unit is inserted, preferably inserted in an interlocking manner, into a receiving unit of the receiving device. Here, the energy storage subunits are advantageously fixed in the receiving units in such a way that the electrodes of the energy storage subunits are arranged in a first contact-making plane and in a second contact-making plane, wherein the electrodes which are arranged in the first contact-making plane are advantageously electrically interconnected by means of at least one first printed circuit board and the electrodes which are arranged in the second contact-making plane are advantageously electrically interconnected by means of at least one second printed circuit board. In particular, it is provided that the energy storage subunit comprises at least one battery cell, wherein, as an advantageous special case, it is provided that the energy storage subunit is a battery cell. In particular, it is provided that the at least one side wall of a receiving unit laterally completely surrounds the energy storage subunit which is arranged in the receiving unit.

The interconnection of the energy storage subunits is advantageously determined by the design of the first printed circuit board and the design of the second printed circuit board. The printed circuit boards have, in particular, conductor tracks by means of which the energy storage subunits are electrically interconnected. This advantageously makes it possible, in particular, to change the interconnection of the energy storage subunits by exchanging the printed circuit boards, in particular since the type of electrically conductive connection of contact-making elements, which make contact with the electrodes of the energy storage subunits, determines which energy storage subunits are electrically interconnected and in what way. The degree of variability of an energy storage unit according to the invention is advantageously increased in comparison to a conventional energy storage unit in this way, in particular since the type of interconnection in the case of identical energy storage subunits determines the power provided by the energy storage unit and also the available capacitance. Furthermore, the complexity in terms of interconnection is advantageously reduced, in particular since no conventional cell connectors are required.

Furthermore, the interconnection of the energy storage subunits is determined by the arrangement of the energy storage subunits in the receiving units, specifically by whether the first electrode is arranged in the first contact-making plane or in the second contact-making plane. In this case, it is provided, in particular, that energy storage subunits which are arranged next to one another are arranged alternately with the first electrode in the first contact-making plane and with the second electrode in the second contact-making plane, in order to interconnect the energy storage subunits electrically in series. In order to interconnect the energy storage subunits electrically in parallel, provision is made, in particular, for the energy storage subunits to be arranged with the first electrodes in the first contact-making plane. If a group of energy storage subunits which are connected in parallel are to be connected to at least one further group of energy storage subunits electrically in series, it is provided, in particular, that the energy storage subunits of said further group are arranged with the second electrodes in the first contact-making plane. Since the interconnection of the energy storage subunits can likewise be determined by the arrangement of the energy storage subunits in the receiving device, the degree of variability of the energy storage unit according to the invention is advantageously further increased in comparison to a conventional energy storage unit in this way.

According to a particularly advantageous refinement of the invention, it is provided that the so-called sense lines are integrated into the at least one first and/or the at least one second printed circuit board. In this case, parameters of the energy storage subunits, such as a voltage which is applied to an energy storage subunit and/or the temperature of an energy storage subunit in particular, are advantageously detected and transmitted to at least one monitoring unit by means of the sense lines. In particular, it is provided that battery cell parameters, such as battery cell voltages and/or battery cell temperatures, are transmitted to cell monitoring units as parameters. At least one monitoring unit is advantageously likewise integrated into the at least one first printed circuit board and/or the at least one second printed circuit board. Therefore, an energy storage unit according to the invention can advantageously be extended in a simple manner to the effect that the energy storage unit comprises at least one monitoring unit, in particular at least one cell monitoring unit (CSC, CSC: Cell Supervising Circuit).

A further advantageous refinement of the energy storage unit according to the invention provides that the energy storage subunits are fixed in the receiving units by at least one cover element. In this case, the at least one cover element is advantageously connected to the receiving device in a detachable manner. A cover element is, in particular, a cover which is designed to close the receiving device.

According to an advantageous variant refinement, the energy storage unit has at least one first cover element and at least one second cover element as cover elements, wherein the first cover element forms the bottom area for the receiving device and the second cover element forms the top area of the receiving device. In this case, the first printed circuit board is advantageously integrated into the first cover element. In this case, the second printed circuit board is advantageously integrated into the second cover element. The at least one first cover element and/or the at least one second cover element are/is advantageously connected to the receiving device in a detachable manner. Therefore, the at least one first cover element and/or the at least one second cover element can advantageously be removed, in particular in order to exchange a defective energy storage subunit. The complexity in terms of servicing is advantageously reduced in this way.

According to a further advantageous variant refinement of the invention, it is provided that the receiving device and/or the respective receiving unit of the receiving device comprises a bottom wall. In this case, the bottom wall of each receiving unit has an opening via which electrical contact can be made with the electrode of the energy storage subunit which is inserted into the receiving unit. It is advantageously provided that the electrode protrudes through the respective opening in the bottom wall in this case. According to an advantageous refinement, it is provided, in particular, that the electrode is of tapered design, wherein the tapering electrode protrudes through the opening in the bottom wall and is pushed into the respective contact-making element, in particular the respective conductor track, of the printed circuit board which is arranged beneath the bottom wall.

If the receiving device or the respective receiving unit has a bottom wall, the receiving units of the receiving device are advantageously closed by a single cover element, wherein it is provided, in particular, that the at least one first printed circuit board is arranged in the cover element. According to an advantageous refinement, it is provided in this case that the electrodes of the energy storage subunits, which electrodes are located in the first contact-making plane, are designed to have an elastically restoring action, so that contact is made with said electrodes in a spring-loaded manner.

According to a further particularly advantageous refinement of the energy storage unit according to the invention, the at least one first printed circuit board and/or the at least one second printed circuit board at least partially form/forms the at least one cover element. That is to say that the at least one first printed circuit board and/or the at least one second printed circuit board virtually close/closes the receiving units and, in the process, advantageously make/makes electrically conductive contact with the energy storage subunits, wherein the energy storage subunits are advantageously electrically interconnected by means of the conductor tracks of the printed circuit boards. A further saving in weight can advantageously be achieved by virtue of this refinement. The at least one first printed circuit board and/or the at least one second printed circuit board can advantageously be exchanged, as a result of which exchanging energy storage subunits is advantageously simplified. Furthermore, a problem when interconnecting the battery cells is advantageously solved in a particularly simple manner by exchanging the at least one first printed circuit board and/or the at least one second printed circuit board.

In this case, a particularly advantageous refinement of the energy storage unit according to the invention provides that the receiving device comprises at least one first insert into which the at least one first printed circuit board is inserted for the purpose of making contact with the electrodes which are arranged in the first contact-making plane, and/or that the receiving device comprises at least one second insert into which the at least one second printed circuit board is inserted for the purpose of making contact with the electrodes which are arranged in the second contact-making plane. Electrical contact is advantageously made with the energy storage subunits in a particularly simple manner here. Furthermore, the printed circuit boards can be exchanged in a simple manner, as a result of which the degree of variability in respect of interconnection of the energy storage subunits is advantageously increased.

A further advantageous refinement of the energy storage unit according to the invention provides that the at least one first printed circuit board and/or the at least one second printed circuit board have/has contact-making elements, which are designed to have an elastically restoring action, for the purpose of making contact with the electrodes, which are arranged in one contact-making plane, of the energy storage subunits in such a way that the contact-making elements are pushed down when the printed circuit board is inserted into the insert, and the contact-making elements make contact with the electrodes under mechanical stress, advantageously in a spring-loaded manner, when the printed circuit board is inserted. The respective printed circuit board advantageously makes good contact with the energy storage subunits in this way. This advantageously results in a lower electrical contact transfer resistance, as a result of which a battery cell is advantageously heated to a lesser extent during operation.

According to a further particularly advantageous refinement of the energy storage unit according to the invention, the at least one first printed circuit board and/or the at least one second printed circuit board have/has contact lugs as contact-making elements, wherein the respective printed circuit board in each case has an opening next to a contact lug, advantageously in such a way that the respective contact lug protrudes into the opening region and the contact lugs are connected to the electrodes of the energy storage subunits by means of a welding process which is performed through the respective opening. In this case, it is provided, in particular, that the contact lugs are contact-making elements which are designed to have an elastically restoring action. In this case, it is provided, in particular, that a spot-welding process is used in order for the contact lugs of the respective printed circuit board to make contact with the electrodes which are located in the respective contact-making plane. In this case, it is provided, in particular, that the receiving device of an energy storage unit according to the invention comprises an insert into which the printed circuit board which has contact lugs and openings is inserted for the purpose of making contact with the electrodes which are arranged in the first contact-making plane. In this case, said first printed circuit board virtually forms the bottom wall for the respective receiving units of the receiving device. In this case, contact is advantageously made with the electrodes in the second contact-making plane by means of at least one second printed circuit board which is integrated into a cover element, wherein it is provided, in particular, that said second printed circuit board makes contact in a spring-loaded manner. In this case, the energy storage subunits are advantageously fixed in the receiving units by the cover element.

In a further advantageous refinement of the invention, the energy storage unit comprises, as the at least one cover element, at least one first cover element in which the at least one first printed circuit board is arranged and/or comprises at least one second cover element in which the at least one second printed circuit board is arranged. According to an advantageous refinement, the at least one first cover element and/or the at least one second cover element are/is fixed to the receiving device, advantageously by means of at least one fixing element, preferably by means of at least one latching element.

According to a further advantageous refinement of the energy storage unit according to the invention, a group of receiving units of the receiving device in each case has at least one connecting element by means of which the group of receiving units is connected, preferably is connected in a detachable manner, to at least one further group of receiving units and/or by means of which the group of receiving units can be connected, preferably can be connected in a detachable manner, to at least one further group of receiving units. A modular construction of the energy storage unit is advantageously provided in this way, this advantageously further increasing the degree of variability in terms of adapting application requirements. In this case, the receiving device can advantageously be extended to the number of receiving units which matches the number of energy storage subunits required. As an advantageous special case, it is provided, in particular, that a group of receiving units comprises precisely one receiving unit. In this case, an energy storage unit can advantageously be readily matched to the required number of energy storage subunits using identical energy storage subunits. In this case, it is provided, in particular, that a group of receiving units comprises a fixed number of receiving units, for example six receiving units. In this case, it is provided, in particular, that in each case one printed circuit board is associated with one group of receiving units. In this way, energy storage units of different capacitance and/or power can advantageously be constructed using the same components, in accordance with the application requirements. In particular, a plug-type connection is provided as a connecting element of a group of receiving units.

It is further provided, in particular, that the receiving device or in each case one group of receiving units of the receiving device is advantageously integrally produced, preferably by means of an injection-molding process. As a result, production of the receiving device is particularly cost-effective. Furthermore, particularly when groups of receiving units can be connected as intended according to the invention, the level of complexity in terms of manufacture is low since energy storage units can be extended to the desired size by connecting receiving units.

According to a further advantageous refinement of the energy storage unit according to the invention, a group of receiving units is respectively spaced apart from another, wherein an intermediate space which is advantageously designed in such a way that a coolant for controlling the temperature of the energy storage subunits can be conducted through said intermediate space is formed between groups of receiving units in each case. As a result, the functionality of temperature control of the energy storage subunits is advantageously also integrated into the energy storage subunit, advantageously without cooling plates or the like being required as a cooling apparatus. Furthermore, a large contact-making area for the coolant is advantageously realized by the respective energy storage subunits here, as a result of which particularly good temperature control of the battery cells is possible.

A further advantageous refinement of the energy storage unit according to the invention provides that the at least one side wall which in each case physically delimits a receiving unit of the energy storage unit is designed as a temperature-control apparatus. In particular, it is provided that the at least one side wall, which in each case physically delimits a receiving unit of the energy storage unit, is designed as a cooling plate, preferably as a cooling plate through which a coolant can flow. To this end, it is provided, in particular, that the cooling plate has cooling ducts. The coolant provided is, in particular, air and/or water and/or a water/glycol mixture and/or a refrigerant, such as R1234yf for example. In particular, it is provided that only a portion of a receiving unit is designed as a temperature-control apparatus.

According to a further advantageous refinement of the invention, it is provided that at least one cooling duct is arranged parallel to the direction of longitudinal extent of the receiving units, preferably in such a way that the at least one cooling duct is arranged so as to adjoin at least one receiving unit of the receiving device. In particular, it is provided that the at least one side wall of a receiving unit of the receiving device has at least one cooling duct, preferably in the direction of longitudinal extent of said side wall.

According to a further advantageous refinement of the invention, it is provided that the energy storage unit comprises a battery management system, wherein the battery management system is at least partially integrated into the at least one first printed circuit board and/or into the at least one second printed circuit board. In this case, it is provided, in particular, that the energy storage unit is a battery module and that energy storage subunits are battery cells. The battery management system advantageously comprises at least one cell monitoring unit (CSC, CSC: Cell Supervising Circuits) for monitoring battery cell parameters, wherein the at least one cell monitoring unit is integrated into the at least one first printed circuit board and/or the at least one second printed circuit board. According to a further advantageous refinement, it is furthermore provided that the battery management system comprises a control unit, in particular a so-called Battery Control Unit (BCU), wherein the control unit is advantageously integrated into the at least one first printed circuit board and/or the at least one second printed circuit board. As a result, the energy storage unit according to the invention is advantageously extended further in functional terms with particularly compact dimensions.

A further advantageous refinement of the energy storage unit according to the invention provides that the energy storage subunits each comprise at least one electrochemical cell, preferably at least one battery cell. If an energy storage subunit has a plurality of electrochemical cells, said electrochemical cells are advantageously electrically interconnected within the energy storage subunit. In particular, it is provided that a plurality of electrochemical cells are arranged one behind the other, preferably in such a way that the electrochemical cells are connected electrically in series. If the electrochemical cells are arranged one behind the other, it is provided, in particular, that the first electrode of the first electrochemical cell is, as it were, the first electrode of the energy storage subunit and the second electrode of the last electrochemical cell is, as it were, the second electrode of the energy storage subunit. The at least one electrochemical cell is preferably surrounded by a metal housing which is provided by the energy storage subunit. In this case, a safety valve can advantageously be inserted into the housing, it being possible for a gas which is formed by an electrochemical cell to escape via said safety valve in order to prevent the energy storage subunit from bursting. Furthermore, the metal housing advantageously prevents moisture from entering the energy storage subunit.

A further advantageous refinement of the energy storage unit according to the invention provides that the receiving units each form a cylindrical volumetric space into which at least one energy storage subunit, which is designed as a round cell, is inserted. In particular, it is provided that the energy storage unit is formed in such a way that at least one round cell with a diameter of between 10 mm and 50 mm (mm: millimeters) can be inserted into the receiving units. In particular, a 18650 lithium-ion round cell with a diameter of 18 mm is provided as a round cell. In particular, it is provided that the at least one round cell is pressed into the volumetric space which is provided by the respective receiving unit. To this end, an advantageous variant refinement provides that the at least one round cell is inserted into the volumetric space and a gap between the receiving unit and the at least one round cell is filled with an adhesive, in particular with a conductive adhesive, preferably with an epoxy adhesive having an aluminum oxide filling or a conductive paste, in particular aluminum oxide with oil. The at least one round cell or the volumetric space which is provided by the respective receiving unit is preferably electrically insulated by a plastic film and/or a coating.

According to a further advantageous refinement of the energy storage unit according to the invention, the receiving units each have, as a connecting element, a termination element, which, at the opposite ends, projects beyond the at least one side wall, wherein the receiving units are connected, preferably are welded, to the receiving device by means of the termination elements. A receiving unit can advantageously be extended to the required size in a variable manner in this way. According to a variant refinement, it is provided that the receiving units are of tubular design, wherein the respective ends of the receiving units are welded to a plate which has openings of the size of the pipe opening depending on the number of receiving units. In this case, it is provided, in particular, that the receiving units are spaced apart from one another, preferably in such a way that a coolant can be conducted through the intermediate spaces between the receiving units, which intermediate spaces are formed in the process.

A further advantageous refinement of the energy storage unit according to the invention provides that the receiving device has at least one sealing wall which closes off intermediate spaces, which are located between the receiving units, to the outside in a sealed manner, wherein the receiving device has connections for supplying and for discharging a coolant to and from the intermediate spaces. As a result, a cooling apparatus is advantageously integrated directly into the energy storage unit, wherein good heat dissipation is provided by the energy storage subunits.

A further advantageous refinement of the invention provides that the energy storage unit has at least one connecting element for mechanical connection of the energy storage unit to at least one further energy storage unit and/or at least one connecting element for electrically conductive connection of the energy storage unit to at least one further energy storage unit and/or at least one connecting element for electrically conductive contact-connection with the energy storage unit by an electrical load device. A further degree of variability for constructing more powerful energy stores is advantageously provided in this way. In particular, it is provided that the at least one connecting element for electrical connection of the energy storage unit to a further energy storage unit is integrated into the at least one connecting element for mechanical connection of the energy storage unit to a further energy storage unit.

In order to achieve the object set out in the introductory part, the invention further proposes an energy storage system comprising a plurality of energy storage units which are electrically interconnected, wherein the energy storage units are energy storage units according to the invention. The energy storage units are advantageously mechanically and electrically connected to one another, advantageously in a detachable manner, by means of connecting elements. If an energy storage unit is designed as a battery module, a battery system or a battery pack can advantageously be constructed from the battery modules. A high degree of variability in terms of adapting to application requirements is advantageously provided in the process.

BRIEF DESCRIPTION OF THE DRAWINGS

Further advantageous details, features and refinement details of the invention will be explained in greater detail in connection with the exemplary embodiments illustrated in the figures, in which.

DETAILED DESCRIPTION

Figure 1:
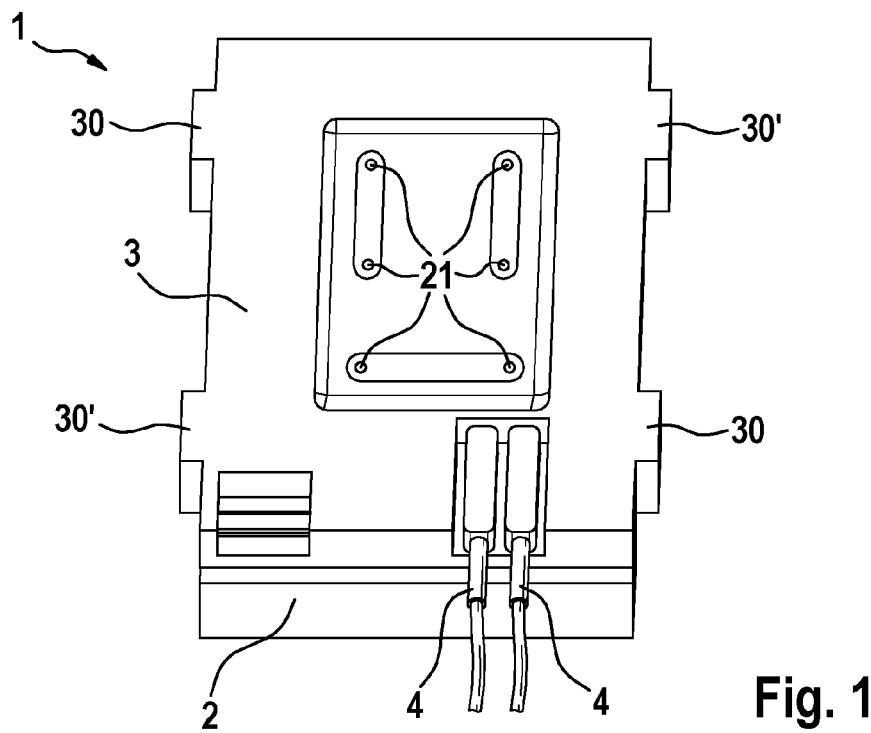
FIG. 1 is a schematic illustration of a perspective view of an exemplary embodiment of an energy storage unit according to the invention.

FIG. 1 shows an exemplary embodiment of an energy storage unit 1 according to the invention. In this case, the energy storage unit 1 comprises a receiving device 2 which is closed by a cover element 3 which is designed as a cover. In this case, the receiving device 2 has a plurality of receiving units (not visible in FIG. 1 owing to the receiving device 2 being closed by the cover element 3) which are arranged next to one another. In this case, the receiving device 2 is integrally produced by means of an injection-molding process in such a way that the receiving units are each physically delimited by side walls. In the exemplary embodiment illustrated in FIG. 1, the cover element 3 is likewise designed as an injection-molded part.

The energy storage unit 1 illustrated in FIG. 1 further has a plurality of energy storage subunits (not visible in FIG. 1 owing to the receiving device 2 being closed by the cover element 3). In this case, the energy storage subunits each comprise a first electrode and a second electrode, wherein the first electrode and the second electrode of a respective energy storage subunit are arranged on opposite sides of the energy storage subunit. In each case one energy storage subunit of the energy storage unit 1 is inserted into one receiving unit of the receiving device 2 in this case.

The side walls of the receiving units are each designed as a cooling apparatus, through which a coolant can flow, for the purpose of controlling the temperature of the energy storage subunits, wherein a coolant can be supplied or discharged by means of the coolant line connections 21 in the cover element 3.

The energy storage subunits of the energy storage unit 1 are fixed in the receiving units by means of the cover element 3. In this case, the electrodes of the energy storage subunits are arranged in a first contact-making plane (not visible in FIG. 1 owing to the receiving device 2 being closed by the cover element 3) and in a second contact-making plane (not visible in FIG. 1 owing to the receiving device 2 being closed by the covering element 3).

In this case, the first contact-making plane is located in the region of the bottom area of the energy storage unit 1. In this case, the electrodes which are arranged in this contact-making plane are electrically interconnected by means of a printed circuit board (not visible in FIG. 1 owing to the receiving device 2 being closed by the cover element 3) which is arranged in the bottom of the receiving device 2.

The second contact-making plane is located beneath the cover element 3. In this case, the electrodes which are arranged in this contact-making plane are electrically interconnected by means of a printed circuit board (not visible in FIG. 1 owing to the receiving device 2 being closed by the cover element 3) which is integrated in the cover element 3.

The energy storage unit 1 illustrated in FIG. 1 furthermore has lateral connecting elements 30, 30' by means of which the energy storage unit 1 can be mechanically and electrically connected to further energy storage units of identical design to form an energy system. In this case, a connecting element 30 of an energy storage unit 1 is in each case designed to be connected to a connecting element 30' of a further energy storage unit. In this case, contact-making elements for electrically conductively connecting the energy storage unit 1 to a further energy storage unit are integrated into the connecting element 30, 30' in each case. The connecting elements 30, 30' are preferably designed as plug-type connectors, so that a detachable connection can be established between the energy storage unit 1 and a further energy storage unit.

Furthermore, the cover element 3 of the energy storage unit illustrated in FIG. 1 has a further connecting element for electrically conductive connection of the energy storage unit 1 to an electrical load device, wherein connection plugs 4 emerge from the further connecting element in the illustrated exemplary embodiment.

Figure 2:
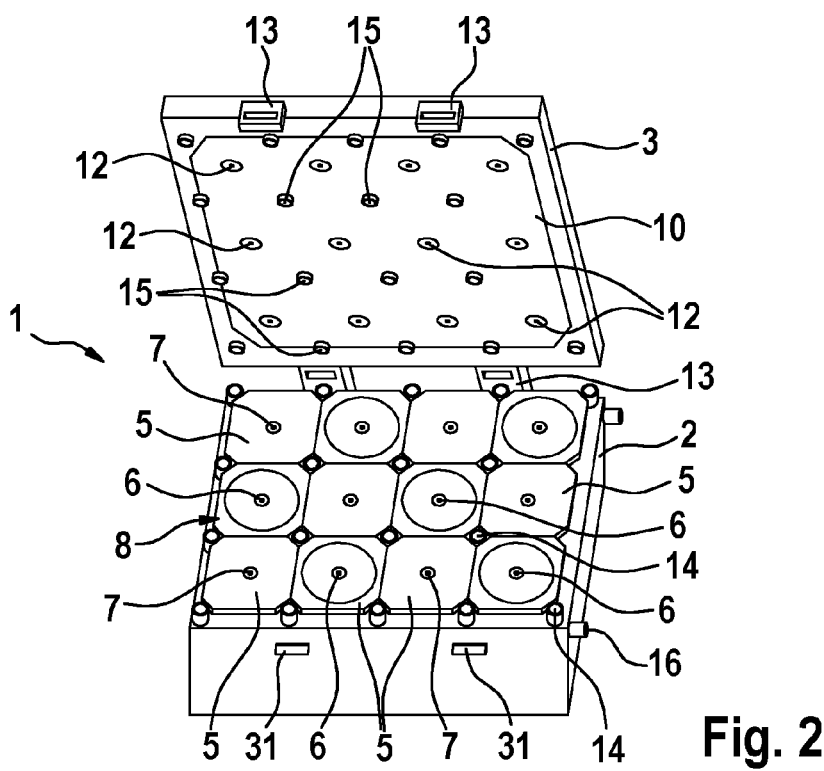
FIG. 2 is a schematic illustration of a perspective view of a further exemplary embodiment of an energy storage unit according to the invention with the cover element open.

FIG. 2 shows a further exemplary embodiment of an energy storage unit 1, wherein the energy storage unit 1 has a receiving device 2 which can be closed by a cover element 3, as explained in connection with FIG. 1. In particular, it is provided that the energy storage unit 1 is designed as a battery module in this case, wherein the energy storage subunits 5 of the energy storage unit 1 are designed as rechargeable battery cells, preferably as lithium-ion cells. In this case, an energy storage subunit 5 in each case comprises a first electrode 6 and a second electrode 7. In this case, the first electrode 6 and the second electrode 7 of a respective energy storage subunit 5 are arranged on opposite sides of the energy storage subunit 5.

In this case, the energy storage subunits 5 of the energy storage unit 1 are each arranged in the receiving units of the receiving device, specifically in such a way that the electrodes 6, 7 of the energy storage subunits 5 are each arranged in a first contact-making plane (above the bottom of the receiving device 2 in FIG. 2) and in a second contact-making plane 8.

The energy storage subunits 5 are furthermore arranged in such a way that the first electrodes 6 of energy storage subunits 5 which are arranged next to one another are alternately arranged in the first contact-making plane and in the second contact-making plane 8. Accordingly, the second electrodes 7 of energy storage subunits 5 which are arranged next to one another are also alternately arranged in the first contact-making plane and in the second contact-making plane 8. In this case, the manner of interconnection of the energy storage subunits 5, amongst other things, is advantageously determined by the manner of arrangement of the energy storage subunits 5. In this case, it is in particular provided that the energy storage subunits 5 are electrically interconnected in series when the energy storage subunits 5 are arranged as illustrated in FIG. 2.

In addition to the manner of arrangement of the energy storage subunits 5, the interconnection of the energy storage subunits 5 is determined by the design of the printed circuit boards with which contact is made with the electrodes 6, 7 of the energy storage subunits 5. In this case, it is provided that the energy storage subunits 5 are arranged on a first printed circuit board (not explicitly illustrated in FIG. 2), wherein this first printed circuit board electrically interconnects the electrodes 6, 7 of the energy storage subunits 5, which electrodes are arranged in the first contact-making plane. The electrodes 6, 7 which are arranged in the second contact-making plane 8 are electrically interconnected by means of the second printed circuit board 10 which is arranged in the cover element 3. In this case, the second printed circuit board 10 has contact-making elements 12 for making contact with the electrodes 6, 7 which are arranged in the second contact-making plane 8. In this case, the contact-making elements 12 are interconnected by means of conductor tracks which are fitted on that side of the printed circuit board 10 which faces the cover element 3.

In the exemplary embodiment illustrated in FIG. 2, the energy storage subunits 5 are additionally fixed in the receiving units (not explicitly illustrated in FIG. 2) of the receiving device 2 by means of the cover element 3. In this case, the cover element 3 has latching elements as fixing elements 13, which latching elements are designed to engage into correspondingly designed catches 31 on the outside of the receiving device 2 and to close the receiving device 2 in a detachable manner.

In the exemplary embodiment, illustrated in FIG. 2, of a refinement according to the invention of an energy storage unit 1, the side walls of the receiving units of the receiving device 2 are designed as a temperature-control apparatus for controlling the temperature of the energy storage subunits 5 by the side walls being partially designed as cooling ducts 14. In this case, connection elements 15 which are designed to correspond to the cooling ducts 14 are arranged in the cover element 3 of the energy storage unit 1, it being possible for the energy storage unit 1 to be connected to a cooling system (not illustrated in FIG. 2) by means of said connection elements, wherein it is provided, in particular, that a coolant is introduced into the cooling ducts 14 by means of at least one connection element 15 and, after flowing through at least one cooling duct 14, is discharged again by means of a further connection element 15. Further connections 16 for discharging and, respectively, supplying a coolant are arranged on the outside of the receiving device 2, wherein it is provided, in particular, that the further connections 16 are connected to connection elements of corresponding design of a further energy storage unit when the energy storage unit 1 is mechanically or mechanically and electrically connected to this further energy storage unit.

Figure 3A:
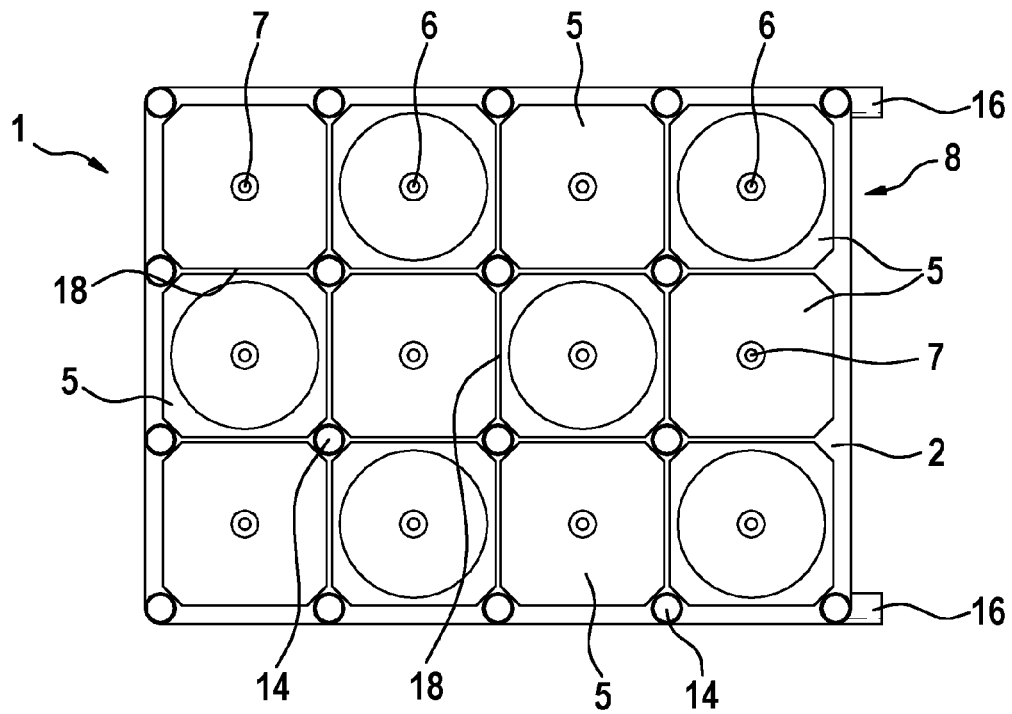
FIG. 3a is a schematic illustration of a plan view of a further exemplary embodiment of an energy storage unit according to the invention without a cover element.

FIG. 3a shows a further exemplary embodiment of an energy storage unit 1, in which further exemplary embodiment a second printed circuit board has not yet made electrical contact with the electrodes 6, 7 which are arranged in the second contact-making plane 8.

As shown in FIG. 3a, the receiving device 2 of the energy storage unit 1 has twelve receiving units, wherein in each case one energy storage subunit 5 is arranged in each of the receiving units. In this case, the receiving units are each physically delimited by circumferential side walls 18. In this case, cooling ducts 14 are arranged in the side walls 18 in such a way that the cooling ducts 14 are arranged parallel to the direction of longitudinal extent of the receiving units. In this case, a cooling duct 14 is in each case surrounded by a maximum of four energy storage subunits 5. Furthermore, a coolant can be supplied and discharged by means of connection elements 16 on the side of the receiving device 2.

Figure 3B:
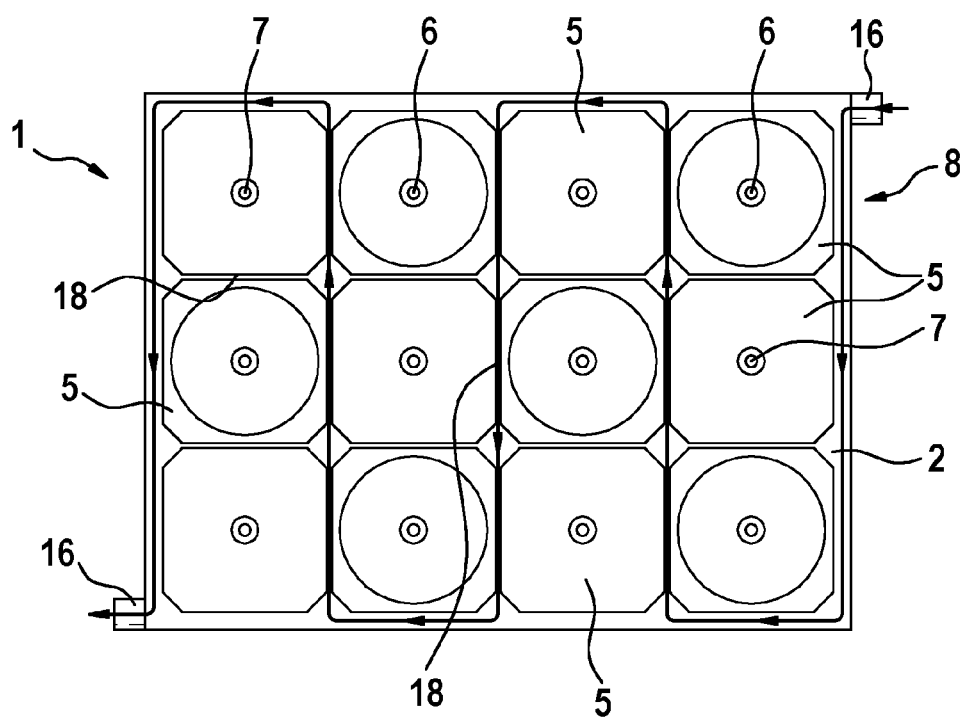
FIG. 3b is a schematic illustration of a plan view of a further exemplary embodiment of an energy storage unit according to the invention without a cover element.

A further advantageous variant refinement of an energy storage unit is illustrated in FIG. 3b. Here, a coolant 22 is conducted through the side walls of the receiving unit 2 in order to control the temperature of the energy storage subunits 5, said coolant being supplied and, respectively, discharged by means of connection elements 16. The side walls are preferably designed virtually over the full height as a cooling duct through which the coolant 22 flows. Particularly good temperature control of the energy storage subunits can advantageously be achieved in this way.

Figure 4:
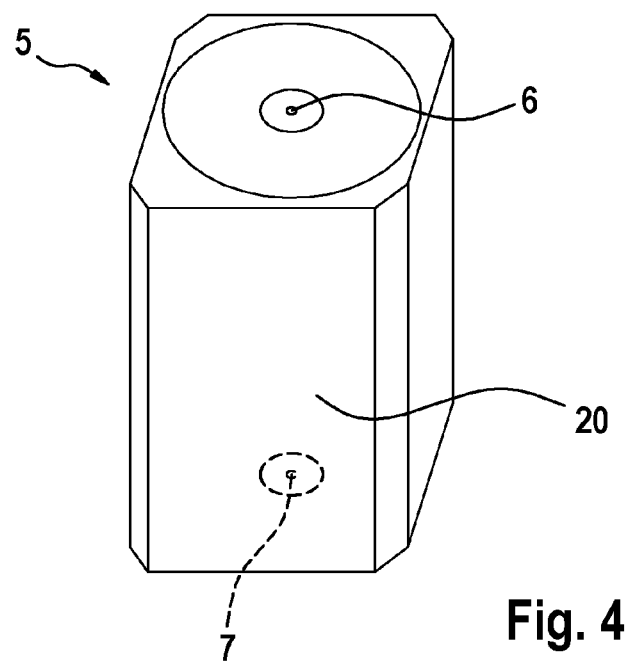
FIG. 4 is a schematic illustration of a perspective view of an exemplary embodiment of an energy storage subunit of an energy storage unit according to the invention.

One possible refinement of an energy storage subunit 5 for use in an energy storage unit 1 according to the invention, in particular an energy storage unit 1 as illustrated in FIG. 1, FIG. 2, FIG. 3a and FIG. 3b, is shown in FIG. 4.

In this case, the energy storage subunit 5 illustrated in FIG. 4 comprises a first electrode 6 and a second electrode 7, wherein the first electrode 6 and the second electrode 7 of the energy storage subunit 5 are arranged on opposite sides of the energy storage subunit 5. In particular, the first electrode 6 can be the positive electrode of the energy storage subunit 5, and the second electrode 7 can be the negative electrode of the energy storage subunit 5. The energy storage subunit 5 is preferably surrounded by a metal housing 20 which advantageously prevents moisture from entering the interior of the energy storage subunit 5.

In particular, it is provided that the energy storage subunit 5 illustrated in FIG. 4 is an electrochemical cell, in particular a secondary battery cell, preferably a lithium-ion cell.

However, it is preferably provided that the energy storage subunit 5 illustrated in FIG. 4 comprises a plurality of electrochemical cells, in particular a plurality of secondary battery cells, preferably a plurality of lithium-ion cells. In this case, the electrochemical cells are preferably electrically interconnected within the energy storage subunit 5. In particular, it is provided that an energy storage subunit comprises a number of electrochemical cells, in particular four electrochemical cells, which are arranged next to one another and are interconnected electrically in parallel. As an alternative or in addition, it is provided, in particular, that the energy storage subunit 5 comprises electrochemical cells which are arranged one above the other, wherein electrochemical cells which are arranged one above the other are preferably connected electrically in series.

Figure 5:
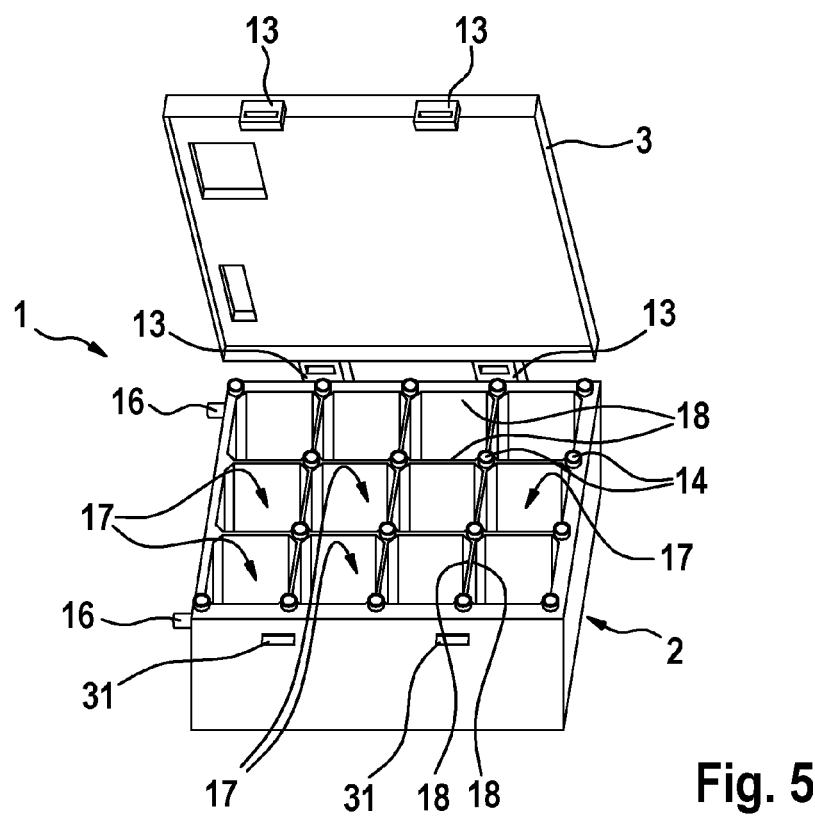
FIG. 5 is a schematic illustration of a perspective view of an exemplary embodiment of a receiving device and a cover element of an energy storage unit according to the invention.

FIG. 5 shows an exemplary embodiment of a receiving device 2 of an energy storage unit according to the invention together with a cover element 3. In particular, the receiving device 2 can be a receiving device of an energy storage unit as explained in connection with FIG. 1, FIG. 2, FIG. 3a and FIG. 3b.

In this case, the receiving device 2 illustrated in FIG. 5 comprises twelve receiving units 17. In this case, the receiving units 17 are each physically delimited by side walls 18. In this case, the side walls 18 are designed as a temperature-control apparatus for controlling the temperature of energy storage subunits, which are inserted into the receiving units 17, by the side walls having cooling ducts 14 at certain points. In this case, a coolant can be supplied to and discharged from the cooling ducts 14 in particular by means of the connection elements 16 which are arranged on the outside of the receiving device 2.

Furthermore, it is provided that a printed circuit board (not explicitly illustrated in FIG. 5) is arranged in the bottom region of the receiving device 2, the electrodes of energy storage subunits which are inserted into the receiving units 17 being electrically interconnected by means of said printed circuit board. In this case, the receiving device 2 has an insert. The printed circuit board which is arranged in the bottom region of the receiving device 2 is inserted into the receiving device 2 by means of said insert for the purpose of making electrical contact with the electrodes of the energy storage subunits, which electrodes are arranged in the region of the bottom area of the receiving device.

A further printed circuit board for electrically interconnecting the further electrodes can advantageously be arranged in the cover element 13. To this end, the cover element 3 advantageously has receiving elements (not explicitly illustrated in FIG. 5) which receive the printed circuit board in a defined position, in particular as illustrated in FIG. 2.

The cover element 3 is further designed, in particular, to be connected in a detachable manner to the receiving device 2 by means of catches 31 and fixing elements 13 which are designed as latching hooks in FIG. 5. In this case, the cover element advantageously closes the receiving device 2 in a sealed manner.

The receiving device 2 and the cover element 3 are each particularly preferably produced as an integral injection-molded part.

Figure 6:
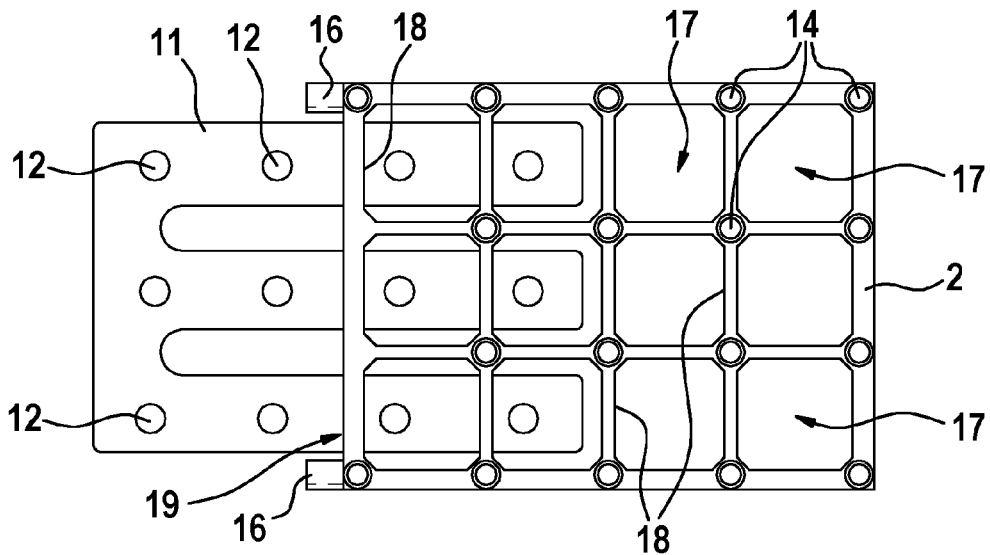
FIG. 6 is a schematic illustration of a plan view of an exemplary embodiment of a receiving device with a printed circuit board of an energy storage unit according to the invention.

FIG. 6 shows, by way of example, how the printed circuit board 11, as explained in connection with FIG. 5, is inserted into an insert 19 of the receiving device 2 so that this printed circuit board 11 can make electrical contact with the electrodes of energy storage subunits which are inserted into the receiving units 17 of the receiving device 2. To this end, the printed circuit board 11 has contact-making elements 12. In this case, the contact-making elements 12 are electrically interconnected by means of conductor tracks (not explicitly illustrated in FIG. 6). The design of the printed circuit board 11 and a further printed circuit board, in particular a printed circuit board which is arranged in the cover element, as explained in connection with FIG. 2, together with the manner of arrangement of the energy storage subunits in the receiving units 17 (with the positive electrode at the top or with the negative electrode at the top) determines how the energy storage subunits are interconnected to form an energy storage unit.

As shown in FIG. 6, the printed circuit board 11 illustrated by way of example in said figure has three sections which are connected to one another, wherein each section is in each case assigned to one row (in FIG. 6 a row from left to right) of receiving units 17. Three separate printed circuit boards, instead of one printed circuit board 11 with three sections, could also be provided in this case.

According to a variant refinement not illustrated in FIG. 6, it is provided that the contact-making elements 12 are designed to have an elastically restoring action, in particular in such a way that the contact-making elements are pushed down when the printed circuit board 11 is inserted into the insert 19 of the receiving device 2, and the contact-making elements 12 make contact with the electrodes of energy storage subunits, which are inserted into the receiving units 17, in a spring-loaded manner when the printed circuit board 11 is inserted.

Figure 23:
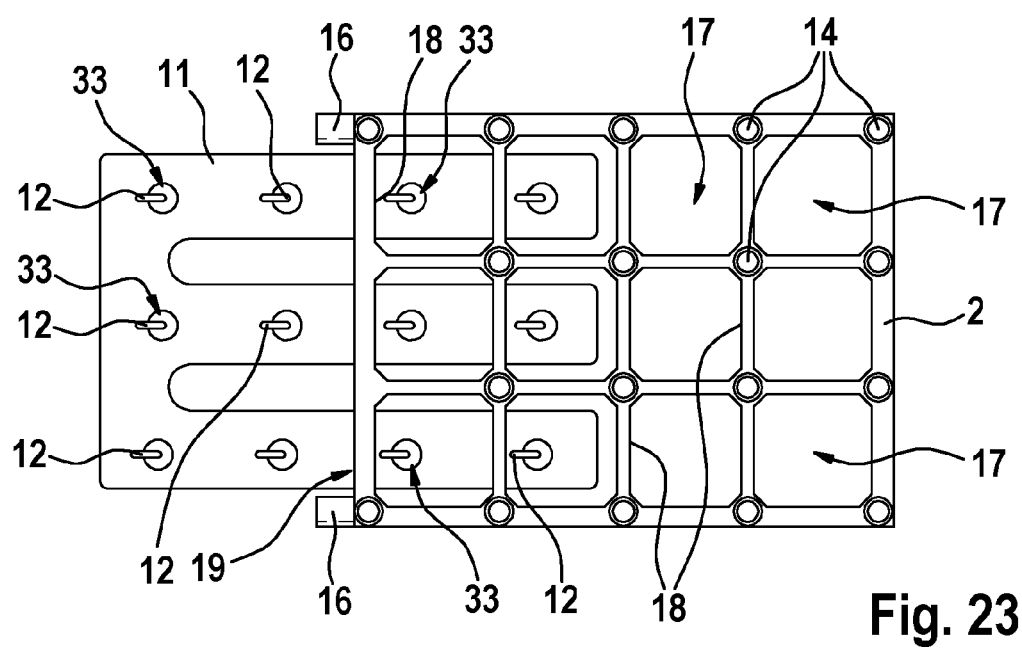
FIG. 23 is a schematic illustration of a plan view of a further exemplary embodiment of a receiving device of an energy storage unit according to the invention with a printed circuit board.

A further advantageous variant refinement is illustrated in FIG. 23. In said figure, the printed circuit board 11 has contact lugs as contact-making elements 12. Furthermore, the printed circuit board 11 has an opening 33 next to each contact lug. In this case, the contact-making elements 12 are arranged in such a way that they end above the respective opening and therefore protrude into the opening region of a respective opening 33, as illustrated in FIG. 23. In particular, it can be provided that the contact lugs are designed to have an elastically restoring action. The contact-making elements 12 which are designed as contact lugs are advantageously subsequently connected to the electrodes, with which they make contact, by means of a spot-welding process which is performed through the respective opening 33.

Figure 7:
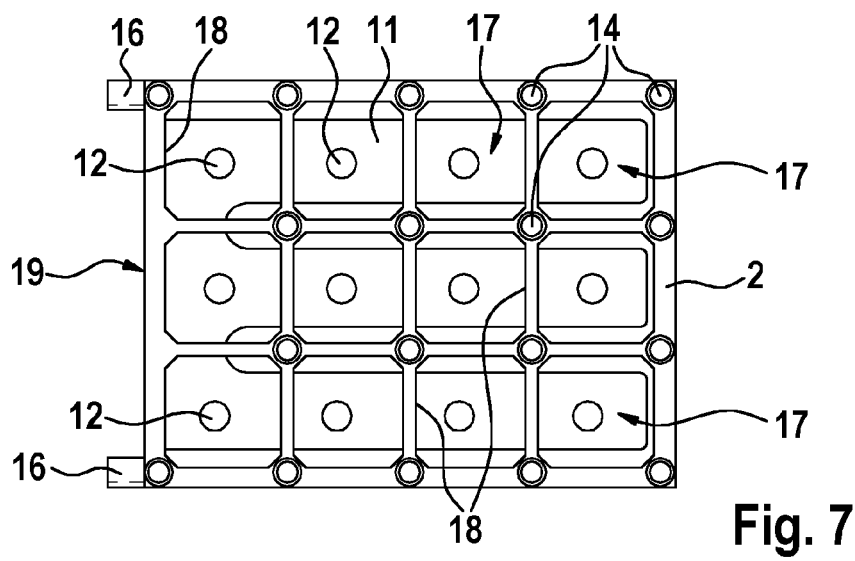
FIG. 7 is a schematic illustration of a plan view of the receiving device illustrated in FIG. 6 with a printed circuit board inserted into the receiving device.

FIG. 7 shows the receiving device 2 from FIG. 6 with a printed circuit board 11 inserted into the insert 19. According to an advantageous variant refinement, it can be provided that the electrodes of the energy storage subunits, with which electrodes the printed circuit board 11 makes contact, are composed of a hard, pointed material and, during arrangement in the receiving units 17, bore into the contact-making elements 12, which are composed of a soft, electrically conductive metal in this variant refinement, and therefore ensure good contact-connection with a low electrical contact transfer resistance.

In particular, it can be provided that a plurality of receiving devices 2 with energy storage subunits inserted into the receiving units 17 of the receiving device 2 are arranged one above the other and/or next to one another, wherein, in particular, it can be provided that the coolant ducts 14 can be connected to the coolant ducts 14 of further energy storage units, just like the connection elements 16. When energy storage units are arranged one above the other, the printed circuit boards 11 are preferably printed on both sides, advantageously in such a way that the printed circuit board 11 serves firstly to make contact with and interconnect the electrodes in the first contact-making plane and furthermore to make contact with and interconnect the electrodes in the second contact-making plane of an energy storage unit which is arranged so as to lie beneath it. A receiving device 2, or the printed circuit board 11 inserted therein, in this case serves, as it were, as a cover element 3 for a receiving device 2 which is arranged beneath it. Energy storage units which are mechanically and electrically connected to one another in this way form an energy storage system according to the invention in the process.

Figure 8:
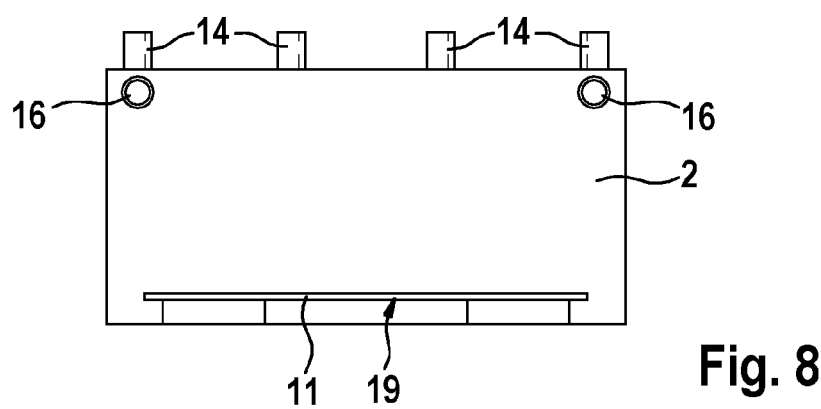
FIG. 8 is a schematic illustration of a side view of an exemplary embodiment of a receiving device of an energy storage unit according to the invention.

FIG. 8 is a lateral illustration of a further exemplary embodiment of a receiving device 2 of an energy storage unit according to the invention. In this case, an insert 19 is provided in the bottom region of the receiving device 2, a printed circuit board 11 being inserted into the receiving device by means of said insert.

Figure 9:
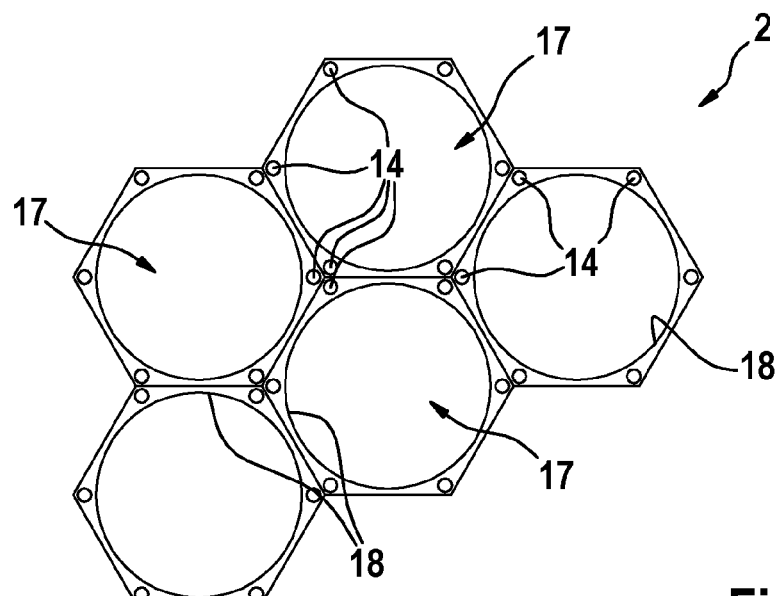
FIG. 9 is a schematic illustration of a plan view of a further exemplary embodiment of a receiving device of an energy storage unit according to the invention.

FIG. 9 shows a further refinement of a receiving device 2 for an energy storage unit according to the invention. In the illustrated exemplary embodiment here, the receiving device 2 has five receiving units 17. In this case, the receiving units 17 each form a cylindrical volumetric space into which at least one round cell can be inserted as an energy storage subunit. In this case, the receiving units 17 themselves have side walls 18 which each form a hexagon to the outside when viewed from the top, so that receiving units 17 can be arranged next to one another in the manner of a honeycomb.

In this case, it is provided that intermediate spaces, through which a coolant can flow, are formed as cooling ducts 14 in the side walls 18 of the receiving units 17. The side walls 18 are therefore advantageously designed as a cooling apparatus for energy storage subunits (not illustrated in FIG. 9) which are inserted into the receiving units 17.

In the exemplary embodiment illustrated in FIG. 9, it is provided, in particular, that the receiving units 17 have connecting elements (not explicitly illustrated in FIG. 9) by way of which a receiving unit 17 is in each case mechanically connected to a further receiving unit 17. The receiving device 2 can advantageously be extended by, in principle, any desired number of receiving units 17. In particular, energy storage units of different capacitance and/or power can be constructed in this way.

Further variant refinements of receiving devices 2 for an energy storage unit according to the invention are shown in FIG. 10 to FIG. 13, in plan view in each case. In this case, the receiving units 17 of the receiving devices 2 once again each form a cylindrical volumetric space into which at least one round cell can be inserted as an energy storage subunit.

Figure 10:
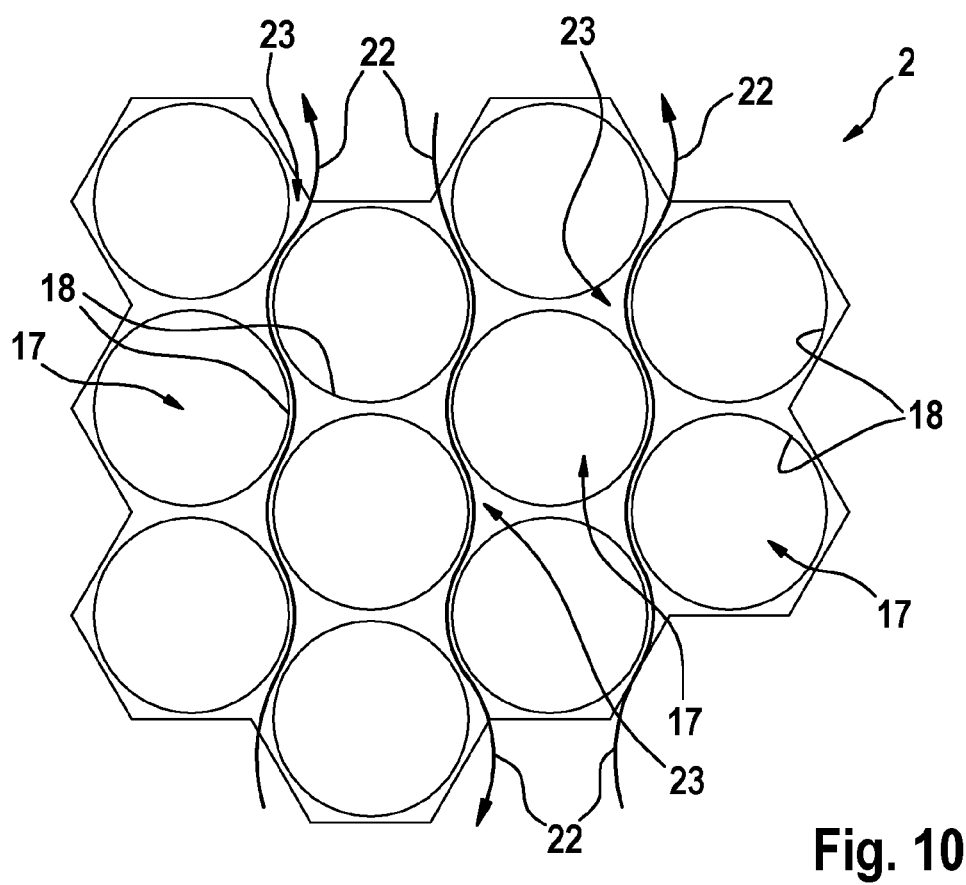
FIG. 10 is a schematic illustration of a plan view of a further exemplary embodiment of a receiving device of an energy storage unit according to the invention.

In the exemplary embodiment illustrated in FIG. 10, the side walls 18 of the receiving units 17 are each spaced apart from one another in such a way that an intermediate space 23 is in each case formed between the receiving units 17. A coolant 22 can then advantageously be conducted through the intermediate spaces 23 for the purpose of controlling the temperature of the energy storage subunits which are to be arranged in the receiving units 17. The intermediate spaces 23 are preferably of meandering design in this case.

Figure 11:
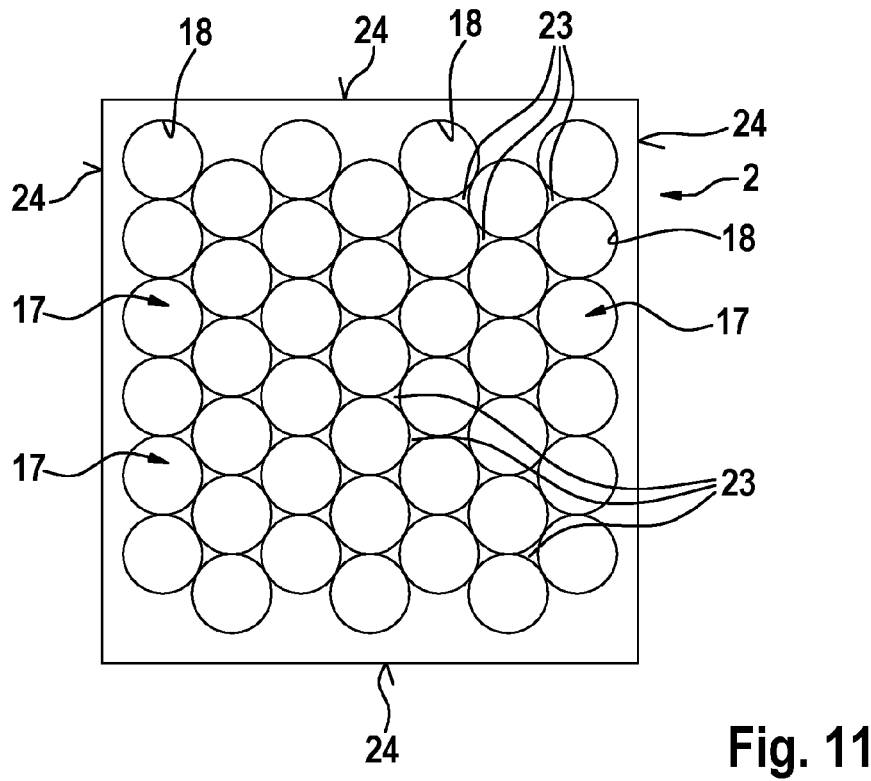
FIG. 11 is a schematic illustration of a plan view of a further exemplary embodiment of a receiving device of an energy storage unit according to the invention.

In the exemplary embodiment illustrated in FIG. 11, it is provided that the receiving units are arranged close to one another with a high packing density, wherein, on account of the round side walls 18, the intermediate spaces 23 formed are designed as cooling ducts which run parallel to the direction of longitudinal extent of the receiving devices 17. In addition, the receiving device 2 is additionally surrounded on its sides by sealing walls 24 which seal off the receiving device 2 to the outside and therefore advantageously prevent coolant escaping.

Figure 12:
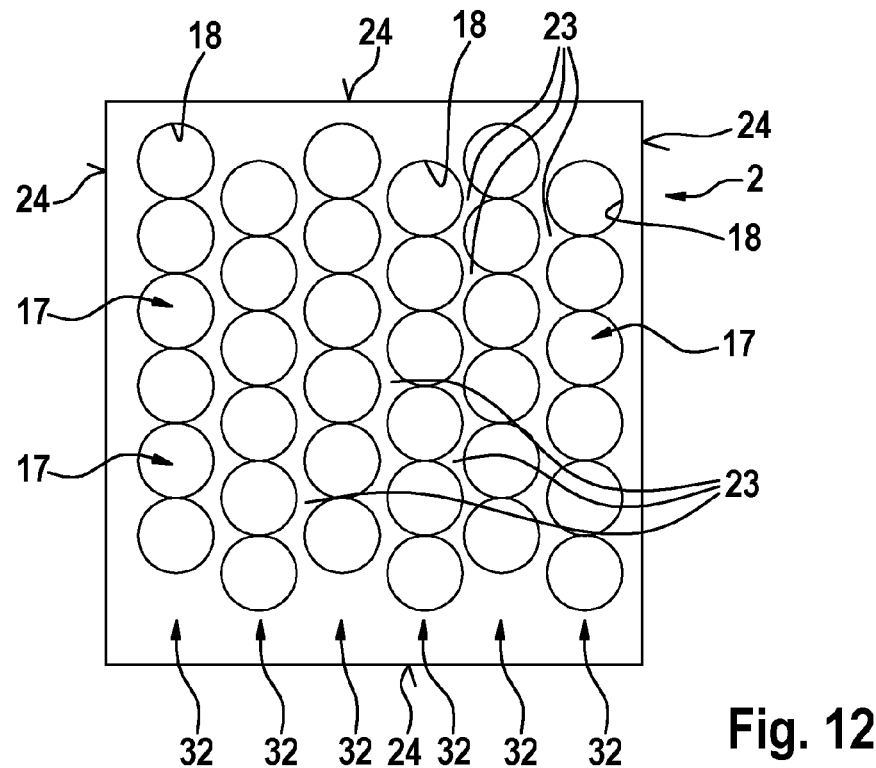
FIG. 12 is a schematic illustration of a plan view of a further exemplary embodiment of a receiving device of an energy storage unit according to the invention.
Figure 13:
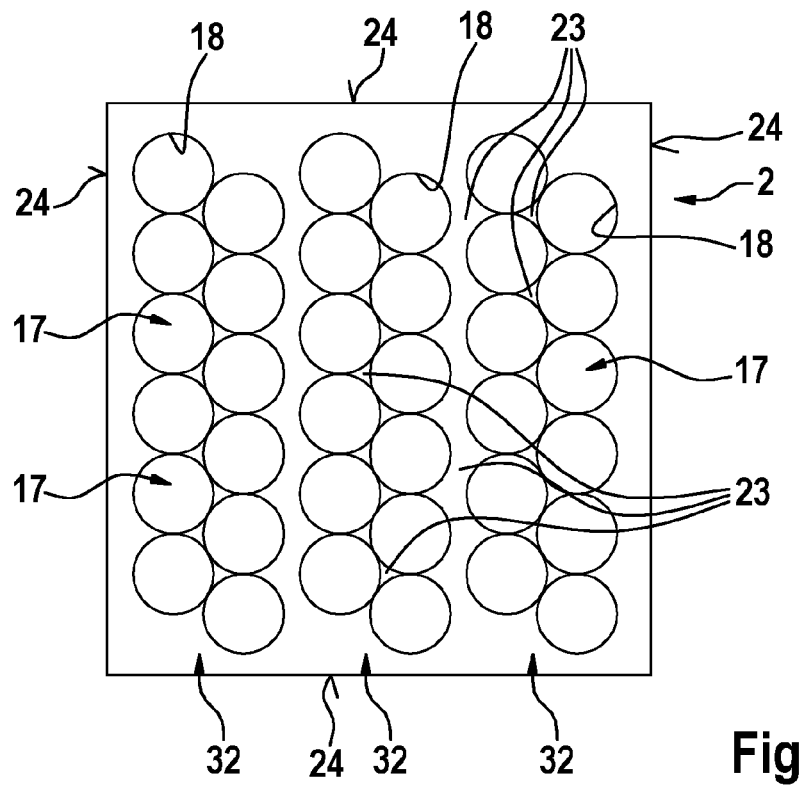
FIG. 13 is a schematic illustration of a plan view of a further exemplary embodiment of a receiving device of an energy storage unit according to the invention.

In FIG. 11, FIGS. 12 and 13 each show, in plan view, further advantageous refinements of a receiving device 2 for an energy storage unit 1 according to the invention. In this case, intermediate spaces 23 are formed between the side walls 18, it being possible for a coolant to be conducted in said intermediate spaces for the purpose of controlling the temperature of energy storage subunits which are inserted into the receiving units 17. In this case, the receiving unit 2 is enclosed by sealing walls 24 which prevent the coolant escaping at the sides.

In the exemplary embodiment illustrated in FIG. 12, it is provided that a group 32 of receiving units 17 is arranged in each case spaced apart from one another, as illustrated in FIG. 12. As a result, an intermediate space 23 is in each case formed between the groups 32 of receiving units 17, it being possible for a coolant to be conducted through said intermediate space for the purpose of controlling the temperature of energy storage subunits which are arranged in the receiving units.

FIG. 13 shows an advantageous combination of the arrangements of receiving units 17 illustrated in FIG. 11 and FIG. 12. That is to say, coolant ducts which are arranged parallel to the direction of longitudinal extent of the receiving units 17 are provided here, as are the three groups 32 of intermediate spaces 23 which surround receiving units and through which a coolant can be conducted.

Figure 14:
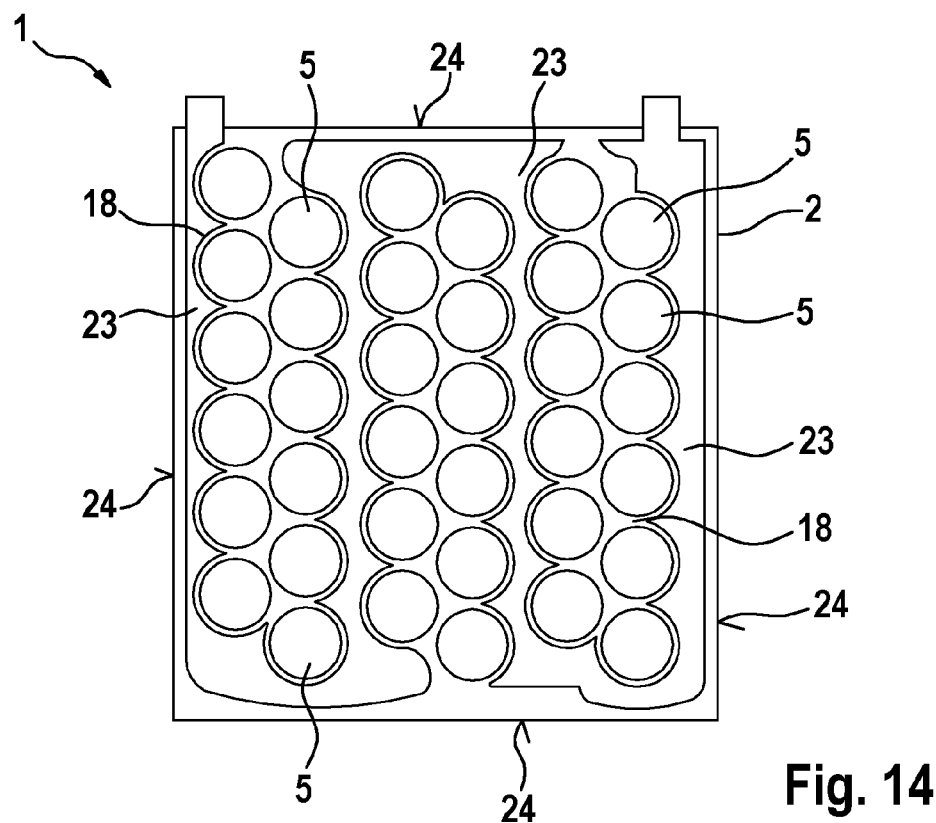
FIG. 14 is a schematic illustration of a plan view of a further exemplary embodiment of a receiving device of an energy storage unit according to the invention.
Figure 15:
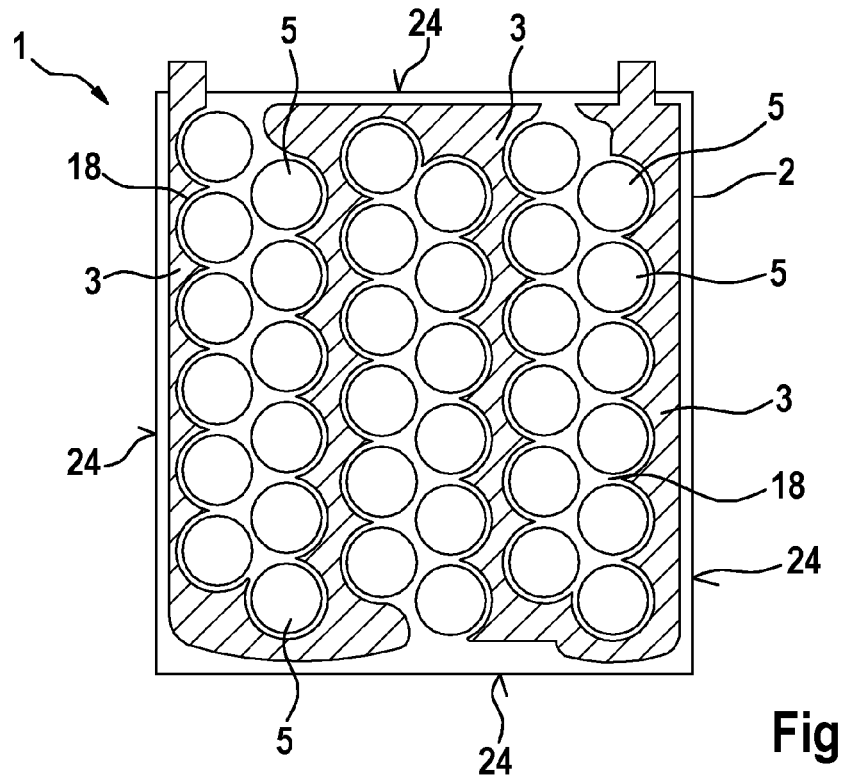
FIG. 15 is a schematic illustration of a plan view of a further exemplary embodiment of a receiving device of an energy storage unit according to the invention.

FIG. 14 shows an exemplary embodiment of an energy storage unit 1 having a receiving device 2 which is integrally produced by means of an injection-molding process. The intermediate spaces 23 through which a coolant can flow in a meandering manner are then subsequently closed by a cover element 3, as illustrated by way of example in FIG. 15. In this case, a coolant can be supplied and, respectively, discharged by means of the connection elements 16. In this case, round cells are respectively arranged as energy storage subunits 5 in the receiving units of the receiving device, which receiving units are enclosed by the side walls 18. The energy storage subunits 5 are not yet interconnected in this case.

Figure 16:
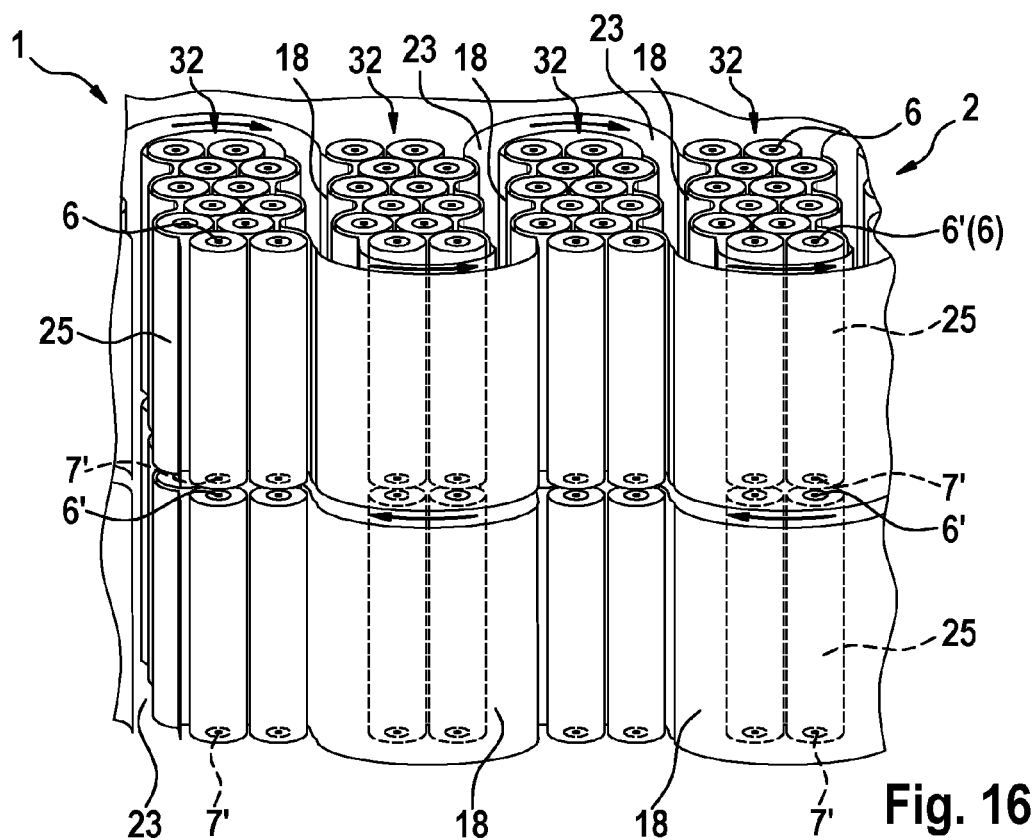
FIG. 16 is a schematic illustration of a perspective view of a further exemplary embodiment of an energy storage unit according to the invention without printed circuit boards.

FIG. 16 shows a further exemplary embodiment of an energy storage unit 1, wherein a plurality of energy storage subunits which are each formed by two battery cells 25 which are arranged one above the other are enclosed. The battery cells 25 which are arranged one above the other are connected electrically in series in this case. The electrode 6' of the upper battery cell 25 of an energy storage subunit is the first electrode 6 of the energy storage subunit in this case. The lower electrode 7' of the lower battery cell 25 is the second electrode 7 of the energy storage subunit in this case. Intermediate spaces 23 in the form of coolant ducts, through which a coolant can be conducted, are once again formed by side walls 18. In this case, the intermediate spaces 23 are subdivided in such a way that a coolant flows in a first direction through the upper part of an intermediate space 23 and in a second direction, which is opposite to the first direction, through the lower part of an intermediate space 23, preferably in such a way that return flow of coolant is implemented by means of the lower part of an intermediate space 23.

Figure 17:
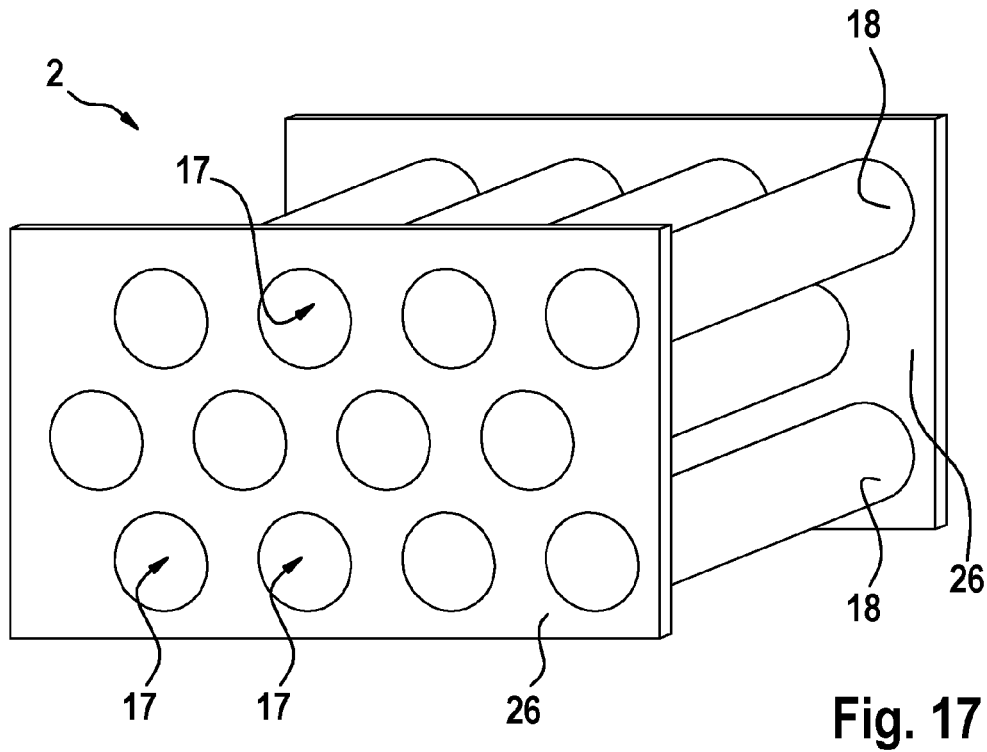
FIG. 17 is a schematic illustration of a perspective view of a further exemplary embodiment of a receiving device of an energy storage unit according to the invention.

FIG. 17 shows a further exemplary embodiment of a receiving device 2 of an energy storage unit 1 according to the invention. In this case, the receiving device 2 comprises a plurality of receiving units 17 which have a cylindrical volumetric space for inserting an energy storage subunit, in particular a round cell. In this case, the volumetric space is delimited by a circumferential side wall 18. In this case, the side walls are preferably composed of metal. However, according to one variant refinement, side walls which are composed of plastic are also provided. At the opposite ends of a respective receiving unit 17, the receiving device 2 has a connecting plate 26 which connects the receiving units 17 to one another. Said connecting plate can be welded, for example, to the receiving units 17. In particular, it is provided that the sealing walls are arranged so as to surround the receiving device 2, as shown in FIG. 11 to FIG. 14, so that a coolant can flow around the receiving units 17.

Figure 18:
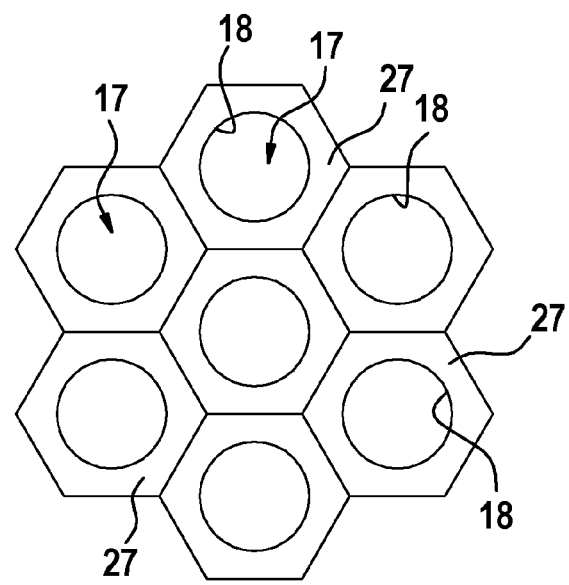
FIG. 18 is a schematic illustration of a plan view of a further exemplary embodiment of a receiving device of an energy storage unit according to the invention.

Instead of a connecting plate 26 of large surface area, it can be provided, in particular, that each of the receiving units 17 has a termination element as the connecting element 27, as illustrated in FIG. 18 by way of example. Here, the receiving units 17 are connected by means of the hexagonal connection elements, in particular by welding, as a result of which a honeycomb structure is formed.

Figure 19:
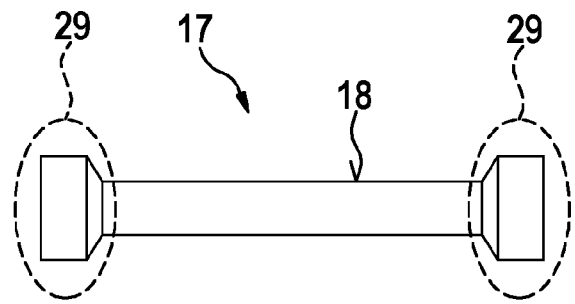
FIG. 19 is a schematic illustration of a side view of an exemplary embodiment of a receiving unit of an energy storage unit according to the invention.
Figure 20:
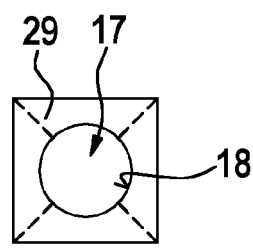
FIG. 20 is a schematic illustration of a plan view of a further exemplary embodiment of a receiving unit of an energy storage unit according to the invention.
Figure 21:
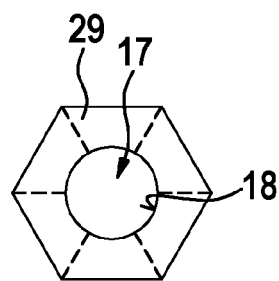
FIG. 21 is a schematic illustration of a plan view of a further exemplary embodiment of a receiving unit of an energy storage unit according to the invention.

FIG. 19 shows a receiving unit 17 which has a tubular side wall, wherein the ends of the receiving unit 17 each have a widened region 29 by means of which one or more round cells can be inserted into the receiving unit 17 as an energy storage subunit. The widened region 29 can, in particular, be widened in a rectangular manner or widened in a square manner, as shown in the plan view of a receiving unit 17 in FIG. 20 by way of example, or widened in a honeycomb manner, as shown in the plan view of a receiving unit 17 in FIG. 21 by way of example.

Figure 22:
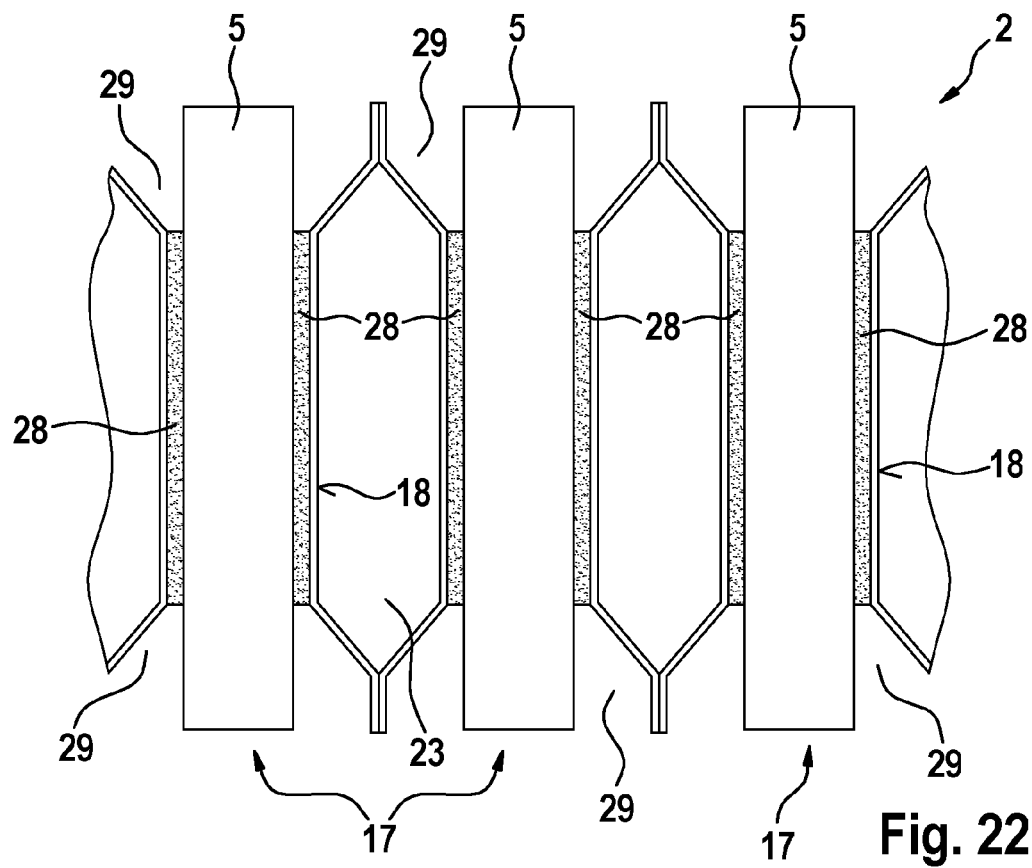
FIG. 22 is a schematic illustration of a section through a further exemplary embodiment of a receiving device of an energy storage unit according to the invention with energy storage subunits inserted.

If the receiving units 17 are connected to one another by means of the widened regions 29, for example by welding the widened regions 29 to one another, a cavity through which a cooling medium, for example water, can flow is respectively formed between the central regions of the receiving units 17. An arrangement of this kind of a plurality of receiving units 17 to form a receiving device 2 is shown in FIG. 22 by way of example. In this case, an energy storage subunit 5 is inserted into each receiving unit 17. A gap between the side wall 18 and the energy storage subunit 5 is filled with a conductive adhesive 28, in particular a thermally conductive epoxy adhesive. In this case, the energy storage subunit 5 is advantageously electrically insulated from the receiving unit 17 by a plastic film (not explicitly illustrated in FIG. 22). If the receiving unit 17 is composed of a plastic material, insulation by a plastic film can be dispensed with. In this case, a coolant can advantageously be conducted through the intermediate spaces 23 between the side walls 18 for the purpose of controlling the temperature of the energy storage subunits 5.

Figure 24:
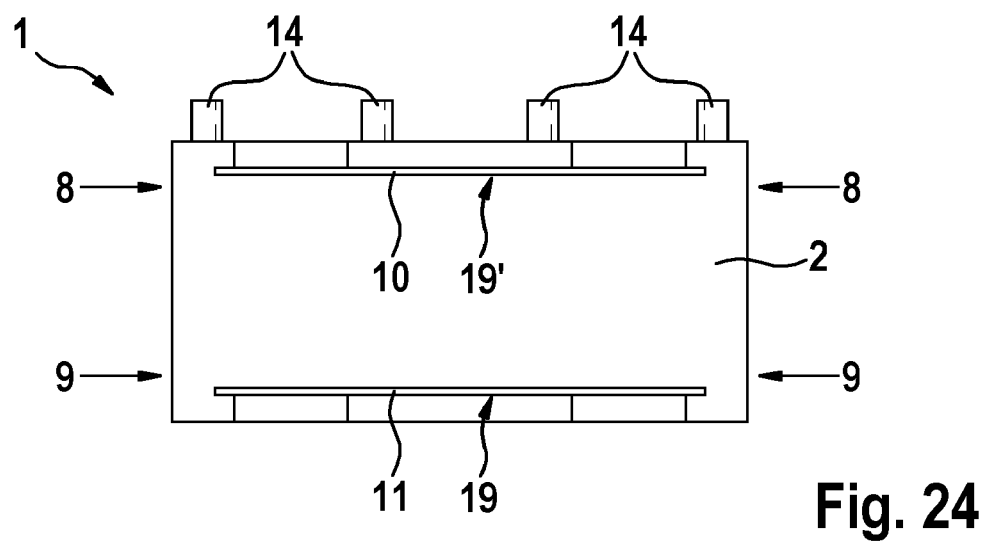
FIG. 24 is a schematic illustration of a side view of an exemplary embodiment of an energy storage unit according to the invention.

A further advantageous exemplary embodiment of an energy storage unit 1 which is designed according to the invention is shown in FIG. 24. The receiving device 2 of this energy storage unit 1 comprises a first insert 19 into which a first printed circuit board 11 is inserted for the purpose of making contact with the electrodes (not explicitly illustrated in FIG. 24) which are arranged in the first contact-making plane 9. Furthermore, the receiving device 2 of this energy storage unit 1 comprises a second insert 19' into which a second printed circuit board 10 is inserted for the purpose of making contact with the electrodes (not explicitly illustrated in FIG. 24) which are arranged in the second contact-making plane 8. In this case, the first printed circuit board 11 and the second printed circuit board 10 form a cover element, that is to say the first printed circuit board 11 and the second printed circuit board 10 close the receiving device 2 and in the process fix the energy storage subunits (not explicitly illustrated in FIG. 24) which are arranged in the respective receiving units in said receiving device.

The exemplary embodiments illustrated in the figures and explained in connection with said figures serve to explain the invention and do not restrict said invention. In addition, the exemplary embodiments illustrated in the figures are not drawn true to scale in some cases.

The invention claimed is:

1. An energy storage unit (1), comprising a plurality of energy storage subunits (5) each having a first electrode (6) and a second electrode (7), wherein the first electrode (6) and the second electrode (7) of a respective energy storage subunit (5) are arranged on opposite sides of the respective energy storage subunit (5), and the energy storage unit (1) also comprising a receiving device (2) having a plurality of receiving units (17) which are arranged next to one another and are each physically delimited by at least one side wall (18), wherein in each case one energy storage subunit (5) of the energy storage unit (1) is inserted into a receiving unit (17) of the receiving device (2), and the energy storage subunits (5) are fixed in the receiving units (17) in such a way that the first electrodes (6) are arranged in a first contact-making plane (8) and that the second electrodes (7) are arranged in a second contact-making plane (9) that is different than the first contact making plane (8), wherein the first electrodes (6) are electrically interconnected by means of at least one first printed circuit board (10) arranged in the first contact-making plane (8) and the second electrodes (7) are electrically interconnected by means of at least one second printed circuit board (11) arranged in the second contact-making plane (9), characterized in that the receiving device (2) comprises at least one first slot (19) into which at the first printed circuit board (10) is inserted to make contact with the first electrodes (6) which are arranged in the first contact-making plane (8).

2. The energy storage unit (1) as claimed in claim 1, characterized in that the energy storage subunits (5) are fixed in the receiving units (17) by at least one cover element (3).

3. The energy storage unit (1) as claimed in claim 2, characterized in that the at least one first printed circuit board (10) and/or the at least one second printed circuit board (11) at least partially form the at least one cover element (3).

4. The energy storage unit (1) as claimed in claim 1, wherein the receiving device (2) comprises at least one second slot into which the second printed circuit board (11) is inserted to make contact with the second electrodes (7) which are arranged in the second contact-making plane (9).

5. The energy storage unit (1) as claimed in claim 4, characterized in that the at least one first printed circuit board (10) and/or the at least one second printed circuit board (11) has contact-making elements (12), which are configured to have an elastically restoring action, for making contact with the electrodes (6, 7), which are arranged in one contact-making plane (8, 9), of the energy storage subunits (5) in such a way that the contact-making elements (12) are pushed down when the respective printed circuit board (10, 11) is inserted into the respective slot (19), and the contact-making elements (12) make contact with the electrodes (6, 7) under mechanical stress when the printed circuit board (10) is inserted.

6. The energy storage unit (1) as claimed in claim 1, characterized in that the at least one first printed circuit board (10) and/or the at least one second printed circuit board (11) has contact lugs as contact-making elements (12), wherein the respective printed circuit board (10, 11) in each case has an opening next to a contact lug in such a way that the respective contact lug protrudes into the opening region and the contact lugs are connected to the electrodes (6, 7) by a welding process which is performed through the respective opening.

7. The energy storage unit (1) as claimed in claim 2, characterized in that the energy storage unit (1) comprises, as the at least one cover element (3), at least one first cover element in which the at least one first printed circuit board (10) is arranged and/or comprises at least one second cover element in which the at least one second printed circuit board (11) is arranged.

8. The energy storage unit (1) as claimed in claim 1, characterized in that a group (32) of receiving units (17) of the receiving device (2) in each case has at least one connecting element (27) by which the group (32) of receiving units (17) is connected to at least one further group (32) of receiving units (17) and/or by which the group (32) of receiving units (17) is configured to be connected to at least one further group (32) of receiving units (17).

9. The energy storage unit (1) as claimed in claim 1, characterized in that the receiving device (2) or in each case one group (32) of receiving units (17) of the receiving device (2) is integrally produced by means of an injection-molding process.

10. The energy storage unit (1) as claimed in claim 1, characterized in that groups (32) of receiving units (17) are respectively spaced apart from one another, wherein an intermediate space (23) is formed between adjacent groups (32) of receiving units (17), and wherein the intermediate space (23) is configured to conduct a coolant (22) for controlling the temperature of the energy storage subunits (5).

11. The energy storage unit (1) as claimed in claim 1, characterized in that the at least one side wall (18) which in each case physically delimits a receiving unit (17) of the energy storage unit (1) is a temperature-control apparatus.

12. The energy storage unit (1) as claimed in claim 1, characterized in that the energy storage unit (1) comprises a battery management system, wherein the battery management system is at least partially integrated into the at least one first printed circuit board (10) and/or into the at least one second printed circuit board (11).

13. The energy storage unit (1) as claimed in claim 1, characterized in that the energy storage subunits (5) each comprise at least one electrochemical cell (25).

14. The energy storage unit (1) as claimed in claim 1, characterized in that the receiving units (17) each form a cylindrical volumetric space into which at least one energy storage subunit (5), which is a round cell, is inserted.

15. The energy storage unit (1) as claimed in claim 1, characterized in that the receiving units (17) each have, as a connecting element (27), a termination element, which, at opposite ends, projects beyond the at least one side wall (18), wherein the receiving units (17) are welded to the receiving device (2) by the termination elements.

16. The energy storage unit (1) as claimed in claim 1, characterized in that the receiving device (2) has at least one sealing wall (24) which closes off intermediate spaces (23), which are located between the receiving units (17), to the outside in a sealed manner, wherein the receiving device (2) has connections (21) for supplying and for discharging a coolant (22) to and from the intermediate spaces (23).

17. The energy storage unit (1) as claimed in claim 1, characterized in that the energy storage unit (1) has at least one connecting element (30, 30') for mechanical connection to at least one further energy storage unit (1) and/or at least one connecting element for electrically conductive connection to at least one further energy storage unit (1) and/or at least one connecting element for electrically conductive connection to an electrical load device.

18. An energy storage system comprising a plurality of energy storage units (1) which are electrically interconnected, characterized in that the energy storage units (1) are energy storage units as claimed in claim 1.

19. The energy storage system as claimed in claim 18, characterized in that the energy storage units (1) are mechanically and electrically connected to one another by connecting elements (30, 30').

* * * * *